United States Patent
Cole et al.

(10) Patent No.: US 10,982,732 B2
(45) Date of Patent: Apr. 20, 2021

(54) METHODS FOR SHORTENING A LINE, EXTRACTING STUCK VEHICLES, BELAYING OBJECTS, JOINING LINES TOGETHER AND FORMING A V-BRIDLE USING A DEVICE

(71) Applicants: Christopher Cole, Elyria, OH (US); James K. Geroux, Fort Edward, NY (US)

(72) Inventors: Christopher Cole, Elyria, OH (US); James K. Geroux, Fort Edward, NY (US)

( * ) Notice: Subject to any disclaimer, the term of this patent is extended or adjusted under 35 U.S.C. 154(b) by 210 days.

(21) Appl. No.: 16/382,437

(22) Filed: Apr. 12, 2019

(65) Prior Publication Data
US 2019/0234487 A1    Aug. 1, 2019

Related U.S. Application Data

(63) Continuation of application No. PCT/US2019/013171, filed on Jan. 11, 2019.
(Continued)

(51) Int. Cl.
*F16G 11/14*    (2006.01)
*B66D 1/60*    (2006.01)
(Continued)

(52) U.S. Cl.
CPC .............. *F16G 11/146* (2013.01); *B66C 1/12* (2013.01); *B66D 1/60* (2013.01); *B66F 19/00* (2013.01)

(58) Field of Classification Search
CPC ...... F16G 11/046; F16G 11/103; F16G 11/14; F16G 11/146; B66D 1/005; B66D 1/60; B66C 1/12; B66F 19/00
(Continued)

(56) References Cited

U.S. PATENT DOCUMENTS

| | | | | |
|---|---|---|---|---|
| 1,421,026 A | * | 6/1922 | Regan | F16G 11/046 24/129 R |
| 3,238,585 A | * | 3/1966 | Froyd | F16G 11/14 24/129 B |

(Continued)

FOREIGN PATENT DOCUMENTS

WO    2017156571 A1    9/2017

OTHER PUBLICATIONS

Notification of Transmittal of the International Search Report (PCT/ISA/210) and the Written Opinion of the International Search Authority (PCT/ISA/237) dated Mar. 14, 2019 filed in PCT/US2019/013171.

*Primary Examiner* — Dean J Kramer
(74) *Attorney, Agent, or Firm* — Rankin, Hill & Clark LLP

(57) ABSTRACT

A device for use with one or more lines that includes a unitary rigid body having an annular portion surrounding a central opening and at least four finger sections that extend from the annular portion of the rigid body. A first finger section and a second finger section curve toward each other on one end of the rigid body and terminate in blunt tips that are spaced apart from each other by a gap. Similarly, a third finger section and a fourth finger section curve toward each other on an opposite end of the rigid body and terminate in blunt tips that are spaced apart from each other by a gap. The device maximizes the pulling strength of lines while reducing the possibility of line failure. Also disclosed are methods of using the device for shortening a line, belaying an object, joining two lines together and for forming a V-bridle.

14 Claims, 25 Drawing Sheets

Related U.S. Application Data

(60) Provisional application No. 62/617,192, filed on Jan. 13, 2018.

(51) Int. Cl.
*B66F 19/00* (2006.01)
*B66C 1/12* (2006.01)

(58) Field of Classification Search
USPC ........................................... 294/82.14
See application file for complete search history.

(56) References Cited

U.S. PATENT DOCUMENTS

| | | | | |
|---|---|---|---|---|
| 5,205,687 A * | 4/1993 | Boyland | ............... | B60P 7/0823 |
| | | | | 24/130 |
| 5,307,751 A * | 5/1994 | Shell | ....................... | F16G 11/14 |
| | | | | 114/218 |
| 5,511,291 A * | 4/1996 | Crawford | ................. | A62B 1/04 |
| | | | | 182/5 |
| 8,001,659 B2 * | 8/2011 | Sorensen | ............... | B60P 7/0823 |
| | | | | 24/130 |
| 8,209,823 B2 * | 7/2012 | Apicella | .................. | A62B 1/14 |
| | | | | 24/130 |
| 2003/0116984 A1 | 6/2003 | Herman | | |
| 2008/0128669 A1 | 6/2008 | Lipke | | |
| 2008/0184533 A1 | 8/2008 | Kelly | | |
| 2013/0133240 A1 | 5/2013 | Beitzel | | |

\* cited by examiner

METHODS FOR SHORTENING A LINE, EXTRACTING STUCK VEHICLES, BELAYING OBJECTS, JOINING LINES TOGETHER AND FORMING A V-BRIDLE USING A DEVICE

CROSS-REFERENCE TO RELATED APPLICATIONS

This application is a continuation of International Application PCT/US2019/013171, filed Jan. 11, 2019, and claims priority to U.S. Provisional App. Ser. No. 62/617,192, filed Jan. 13, 2018.

BACKGROUND OF INVENTION

Field of Invention

In many applications, it is desirable to shorten a line (e.g. a rope). One such application is in vehicle recovery using a winch, because a winch exerts its maximum pulling power on the first layer of line recovered on the winch drum.

There are essentially two types of vehicle recovery operations using a winch: one which uses another vehicle's winch to recover the stuck vehicle; and one which uses the stuck vehicle's own winch (self-recovery).

In the first type of recovery operation, the stuck vehicle serves as an attachment point for the winch line and/or for a winch line extension that comes from the recovery vehicle. In this case the recovery vehicle is preferably positioned for optimal winch pulling power and some take out slack. When the recovery vehicle cannot be optimally positioned, a line-shortening device can be used. This might occur, for example, when the stuck vehicle is mired in a swamp. The recovery vehicle can be positioned on a bank or other suitable ground surface, and the winch line from the recovery vehicle can be unspooled. It may be necessary to attach a winch line extension to reach the stuck vehicle. A line-shortening device can then be used to shorten the winch line extension appropriately so that the winch can exert maximum pulling power to pull out the stuck vehicle. After the first pull it may be possible to reach the stuck vehicle with the winch line. If not, the winch line can be unspooled again, and the winch line extension can be shortened using the line-shortening device for a second pull. This will allow the winch to exert maximum pulling power on the second pull.

The same general principles apply in self-recovery operations. In this case the winch line and/or winch line extension extending from the winch of the stuck vehicle is attached to an anchor. This anchor could be another vehicle, a tree or essentially any structure or object suitable to withstand the load of the stuck vehicle extracting itself using its own winch. In this instance, the line (winch line and/or a winch line extension) can be shortened to allow the winch on the stuck vehicle to exert maximum pulling power to free the stuck vehicle. As in the prior case, the shortening operation can be done repeatedly until the vehicle has recovered itself.

In both circumstances previously described (and with reference to FIGS. 1-8), it is conventional to use a "dog bone" device 40 and a "daisy chain knot" 50 to shorten the line 10 (winch line or winch line extension). FIG. 1 shows a free-running line 10 that is about to be pulled upwardly through a loop 20 (the loop and the free-running line extend from the left from an anchor point, which could be the stuck vehicle or some other suitable anchor). FIG. 2 shows the free-running line 10 being pulled upwardly through the loop 20. FIG. 3 shows further progress of pulling the free-running line 10 through the loop 20. FIG. 4 shows a bend 30 being formed. FIG. 5 shows the bend 30 from a different perspective. FIG. 6 shows a conventional "dog bone" device 40 being inserted below the free-running line 10, but through the bend 30. FIG. 7 shows the "dog bone" device 40 fully inserted. And, FIG. 8 shows the fully inserted "dog bone" device 40 from above.

Although this arrangement is conventional, it can present problems. For example, in heavy load applications, the "daisy chain knot" 50 and the "dog bone" device 40 result in the formation of a "bight-on-a-bight" on the three-line side 70 of the "dog bone" device 40. In the context of this invention, a "bight" is understood to refer to where a first section of line is folded over a second section of line and in so doing "bites" or "locks down" on the second section of line to prevent slippage of the second section of line when the lines (and particularly the free-running line) are brought under tension. If tension on the three lines on the three-line side 70 of the "dog bone" device 40 is not properly equalized when the "dog bone" device 40 is inserted, then when force is applied the bight or bights in the bight-on-bight can creep, which sometimes leads to line breakage. Another significant problem with use of the conventional "dog bone" device is that the "dog bone" device can become dislodged from (i.e., can fall out of) the line if the line goes slack. This results in the line no longer being contained by the "dog bone" device and any shortening that was being accomplished by the "dog bone" device coming undone. This can produce catastrophic results such as the vehicle being recovered rolling uncontrollably down a hill as the line uncontrollably unravels.

BRIEF SUMMARY OF THE INVENTION

The present invention provides a device for use with one or more lines and methods of using same. The device and method can be used to shortening a line much faster than through the use of a conventional "dog bone" device, and completely eliminates the bight-on-bight problems mentioned above. Tension on the three lines extending from the inventive device can self-equalize via permitted slippage without risk of line breakage or the device coming free from the line. Several methods of using the inventive device are also disclosed.

The foregoing and other features of the invention are hereinafter more fully described below, the following description setting forth in detail certain illustrative embodiments of the invention, these being indicative, however, of but a few of the various ways in which the principles of the present invention may be employed.

BRIEF DESCRIPTION OF THE DRAWINGS

With reference to the accompanying drawing figures, please note that.

DETAILED DESCRIPTION OF THE INVENTION

Figure 1:
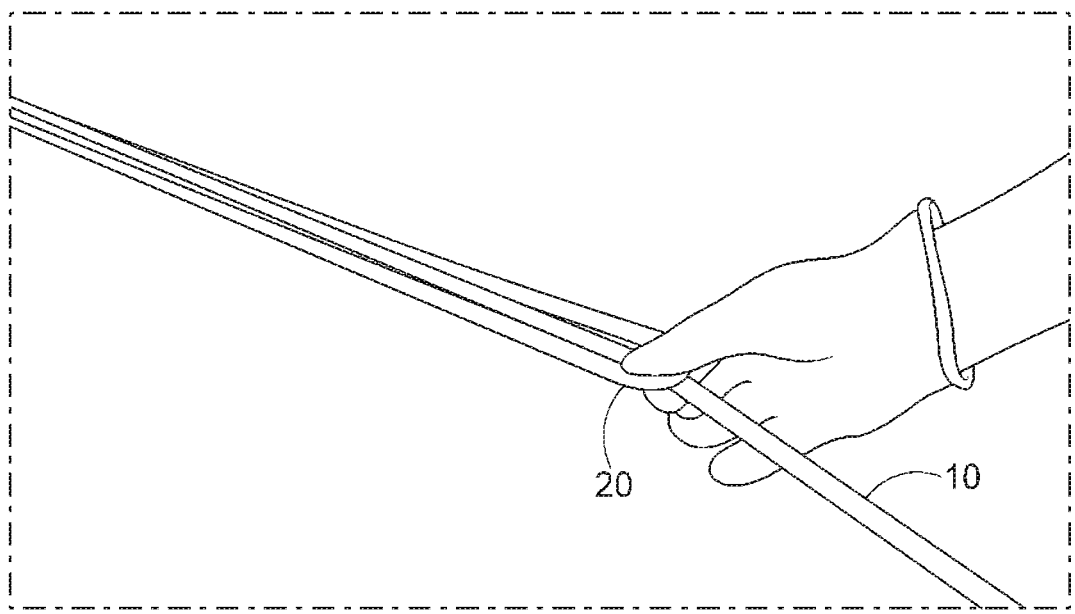
FIGS. 1-8 are a series of schematic drawings that sequentially show a prior art "dog bone" device being inserted in a line as part of a line-shortening operation.
Figure 2:
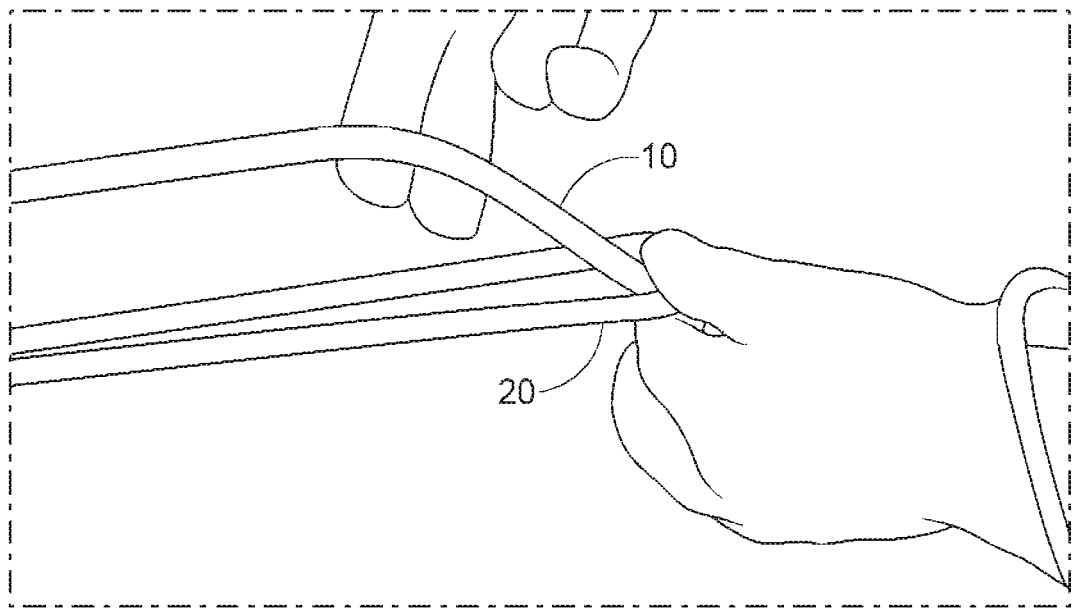
Figure 3:
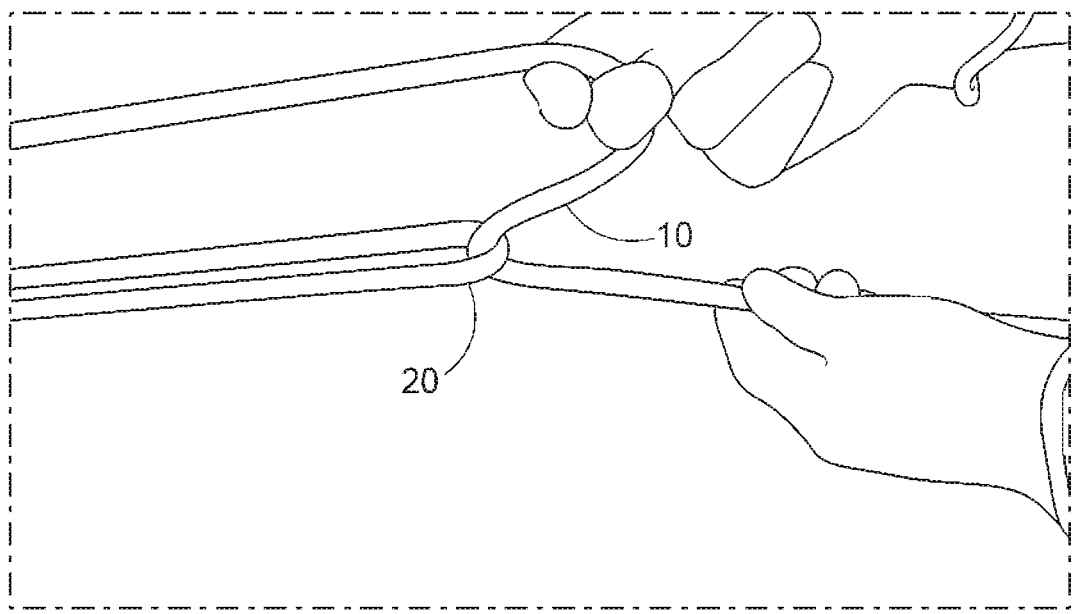
Figure 4:
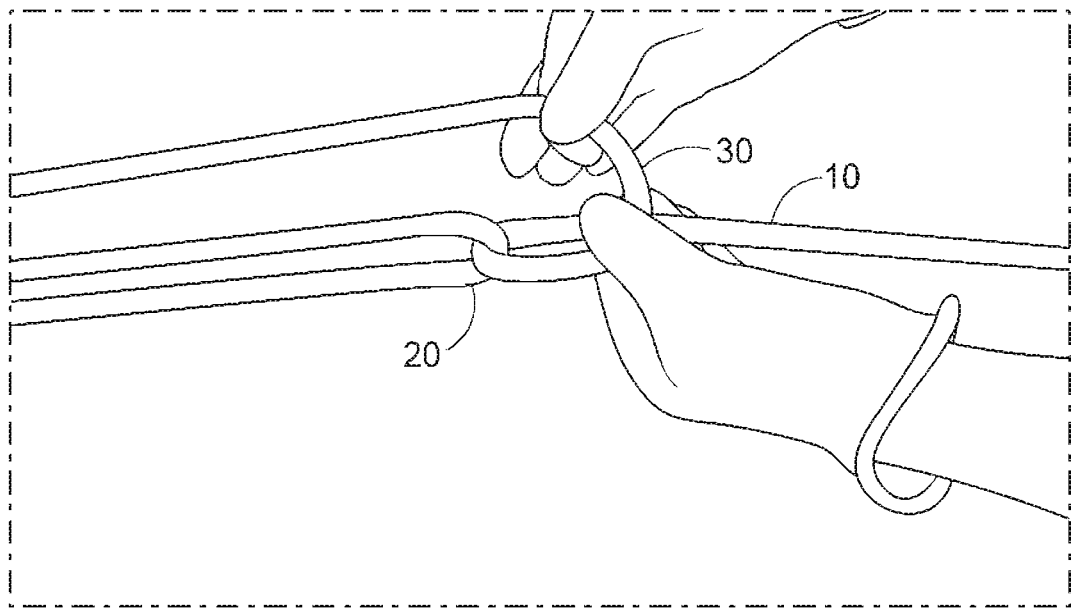
Figure 5:
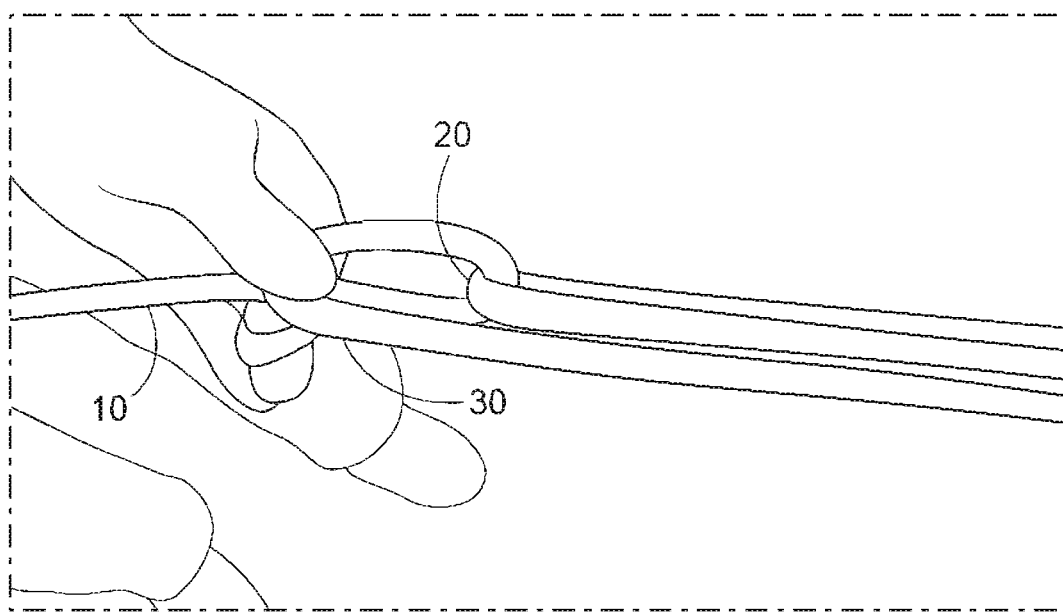
Figure 6:
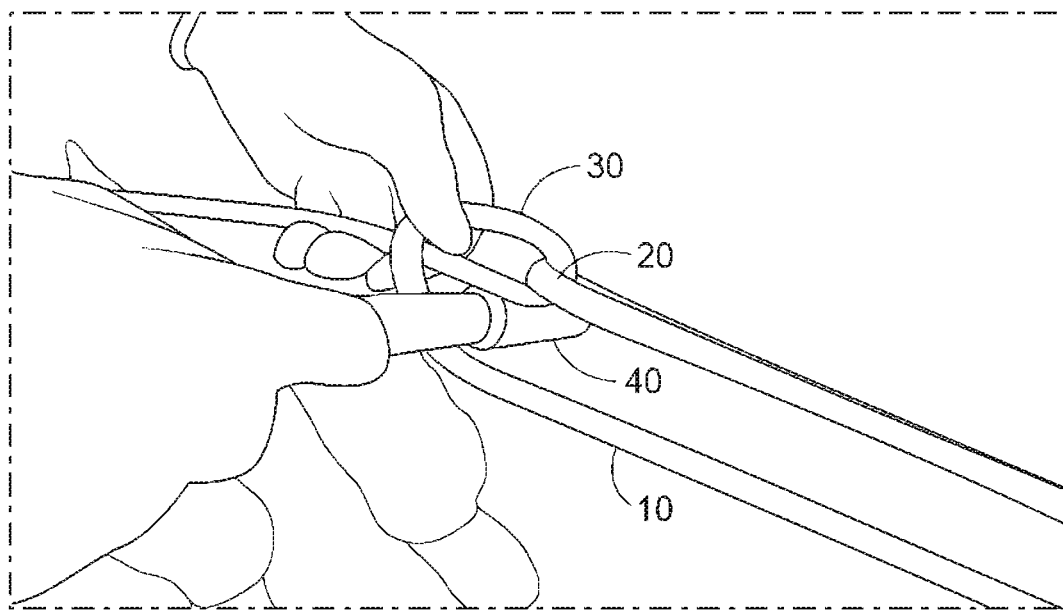
Figure 7:
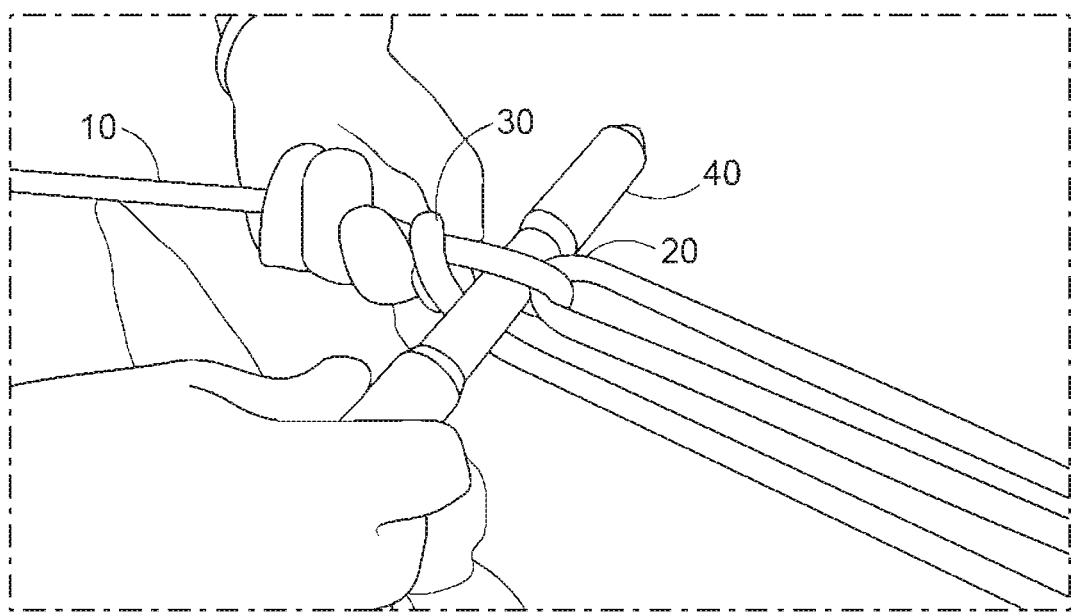
Figure 8:
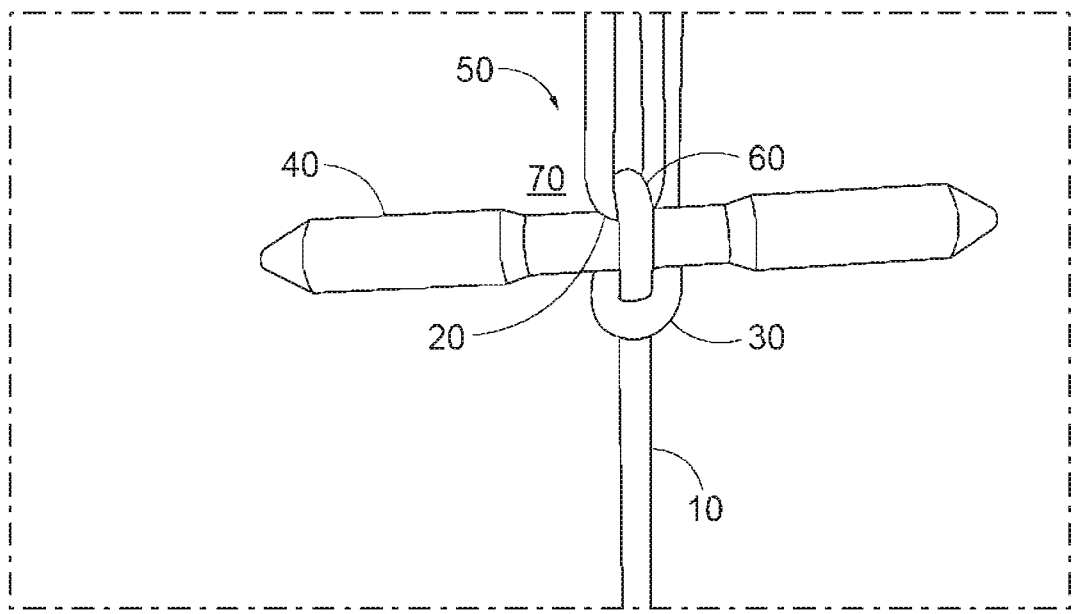
Figure 9:
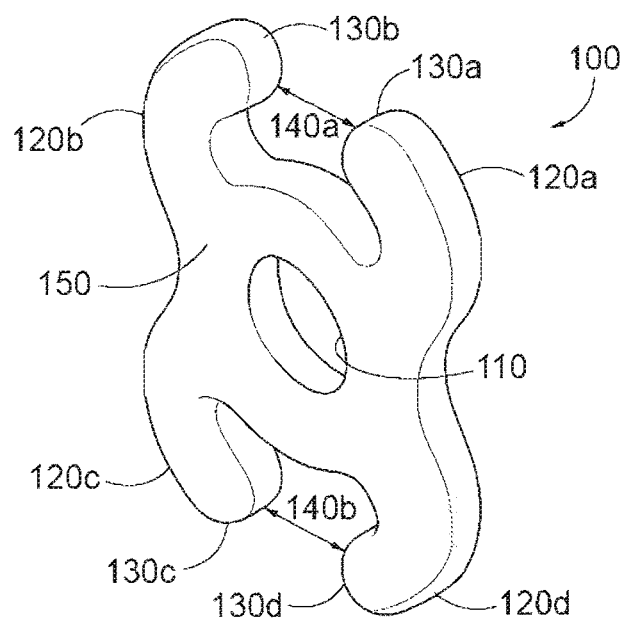
FIG. 9 is a perspective view showing an exemplary device for use with one or more lines according to the invention.

FIG. 9 schematically illustrates a perspective view of an exemplary device 100 according to the invention. The device 100 is a unitary rigid body preferably formed of a high strength metal alloy, such as 6061-T651 aluminum. However, it will be appreciated that other alloys/materials could also be used within the spirit of the invention. For example, it is envisioned that non-metallic materials (e.g., high-strength polymeric materials and/or carbon fiber composites) could also be used.

The device 100 includes a central opening 110, which in the illustrated embodiment is circular. The device 100 also includes four finger sections 120a-120d (which are sometimes referred to as first, second, third and fourth finger sections). The finger sections 120a-120d have blunt tips 130a-130d. The blunt tips 130a, 130b of finger sections 120a, 120b, generally face toward each other on one side of the device 100. The blunt tips 130c, 130d of finger sections 120c 120d, generally face toward each other on the opposite side of the device 100. There is a gap 140a between the blunt tips 130a, 130b of finger sections 120a, 120b, and a gap 140b between the blunt tips 130c, 130d of finger sections 120c 120d. The gaps 140a, 140b are at least as wide as a diameter of a line or lines to be used with the device 100. The finger sections 120a-120d are preferably curved, have no sharp edges and extend from a generally annular structure 150 that bears and defines the central opening 110. The device 100 preferably includes no edges that could damage a line, and has surfaces that allow a line to slide, slip or glide when the device 100 is attached to a line without damaging the line. It will be appreciated that the dimensions of the device 100 will be determined, in large measure, by the diameter of the line or lines to be used with the device 100. In other words, the larger the diameter of the line, the larger the device 100 that should be used (and vice versa).

Figure 10A:
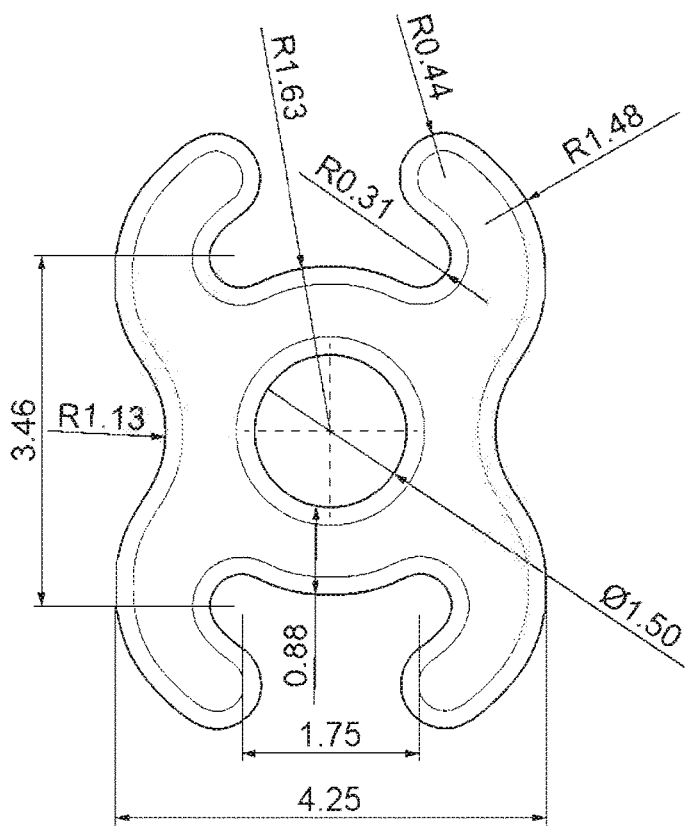
FIGS. 10A and 10B show a front side and right side view of the device shown in FIG. 9, with dimensions.
Figure 10B:
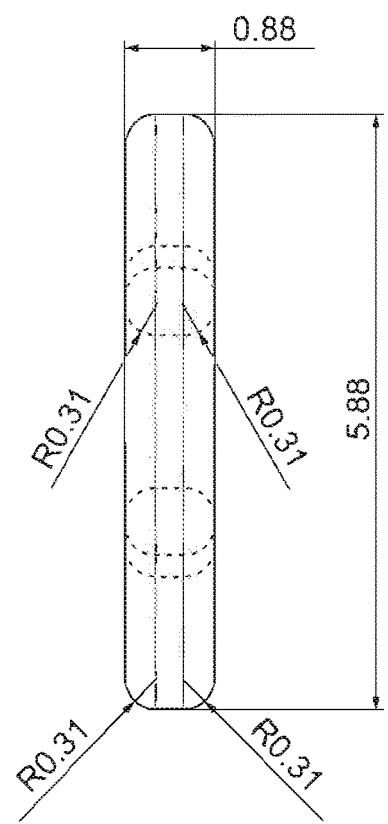

FIGS. 10A and 10B provide a front plan view and a right side view, respectively, of a device 100 according to the invention showing preferred dimensions (in inches) for synthetic winch lines having a diameter of ⅜ inches to ⁷⁄₁₆ inches (~9 mm to 11 mm). As discussed in the following paragraph, in a "bight on a bight" situation, the bend radius of the line in a "bight on a bight" situation is the diameter of the line itself. This is less than optimal (i.e., the bend radius on the line is too small and can lead to line damage). The minimum acceptable bend radius to avoid damage to a line is at least about 2 times the diameter of the line (i.e., ≥~2 times the line diameter), and more preferably at least about 3 times the diameter of the line (i.e., ≥~3 times the line diameter). The device 100 according to the invention not only eliminates the "bight on a bight" situation when used, but it also features smooth line contacting surfaces that predefine and limit the bend radius on the line from being less than the minimum acceptable bend radius and thus prevents damage to the line. The smoothness of the line contact surfaces also allows the line so slide and thus self-equilibrate tension on the line or lines when a load is applied.

Figure 11:
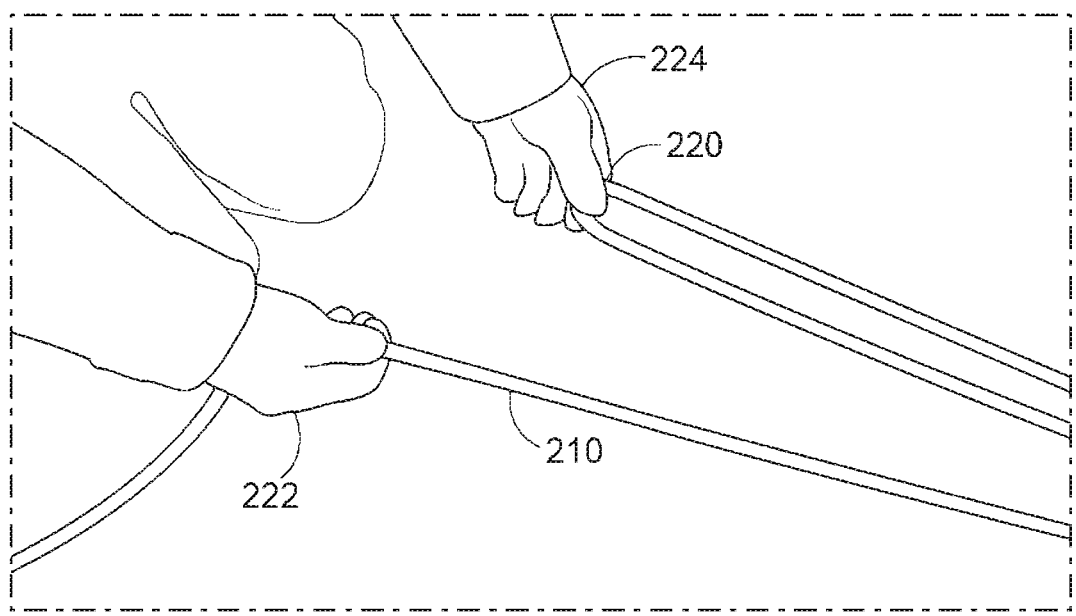
FIGS. 11-22 are a series of schematic drawings that sequentially show the inventive device being used in a line-shortening method according to the invention.
Figure 12:
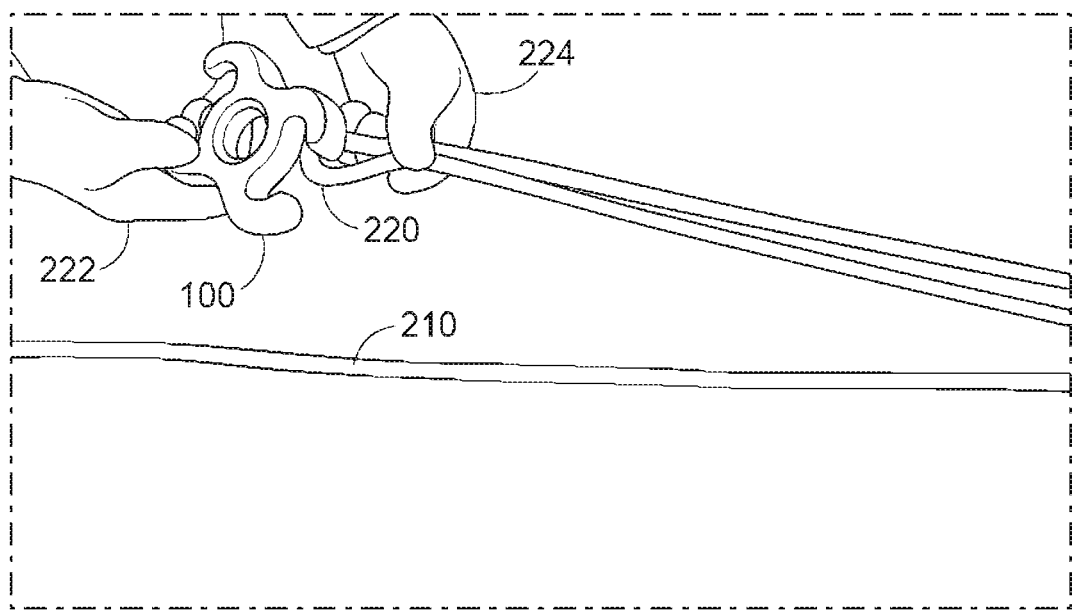
Figure 13:
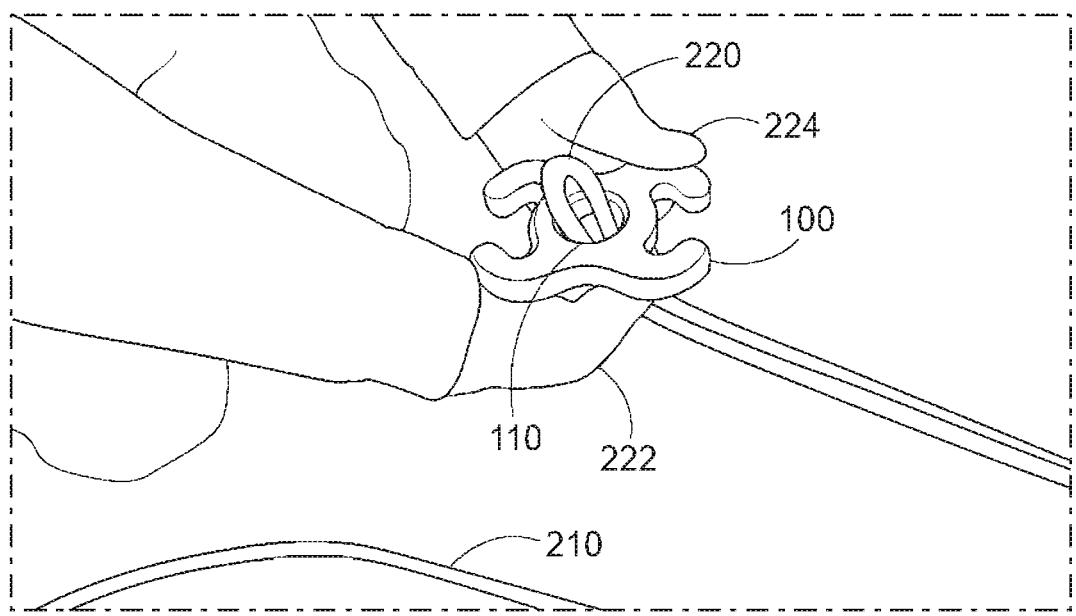
Figure 14:
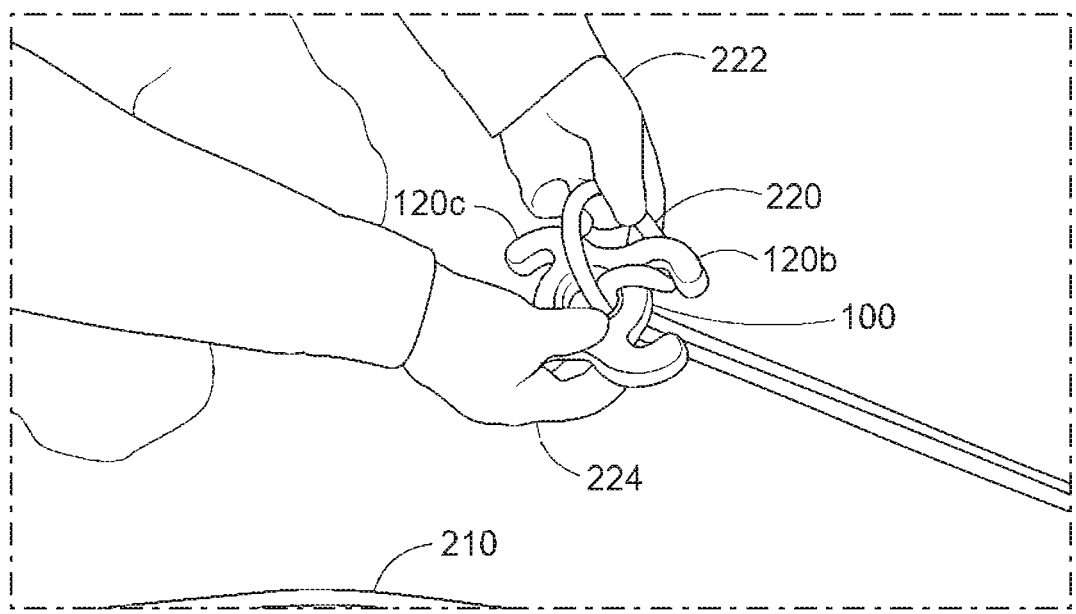
Figure 15:
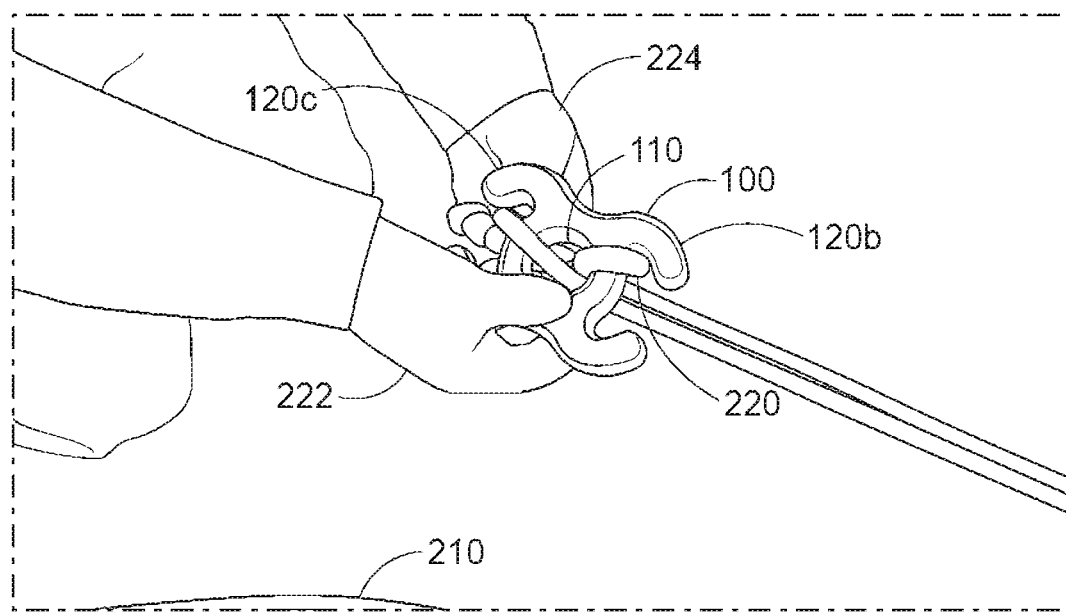
Figure 16:
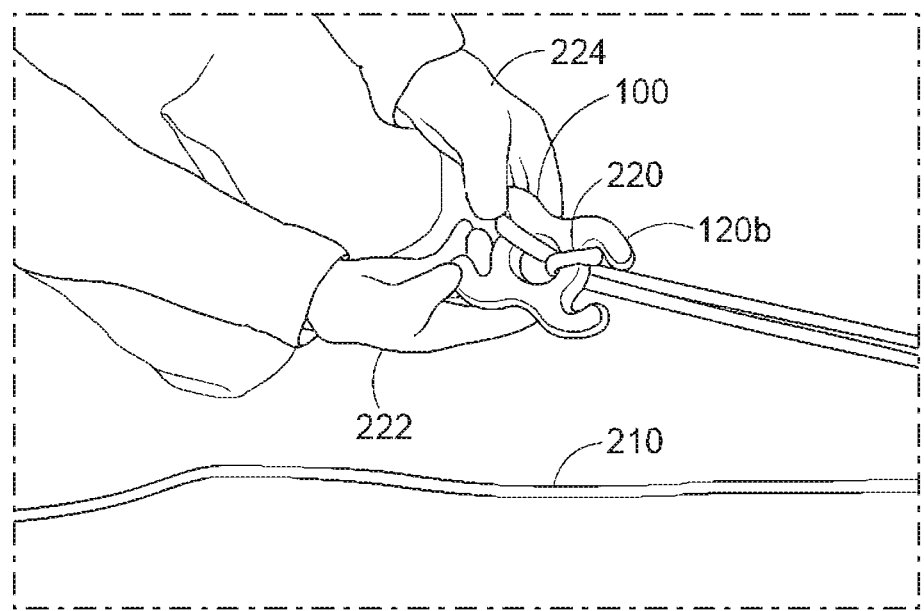
Figure 17:
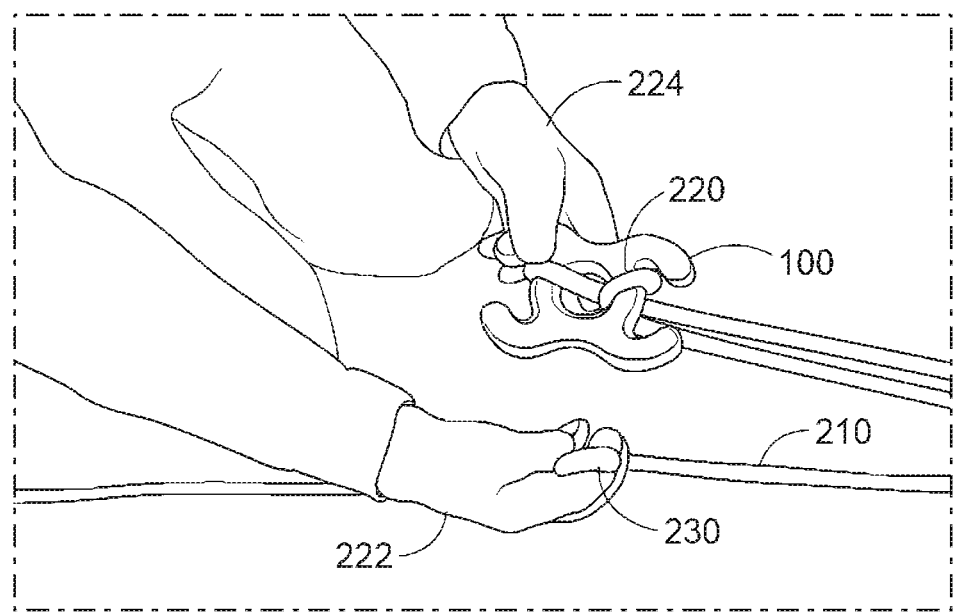
Figure 18:
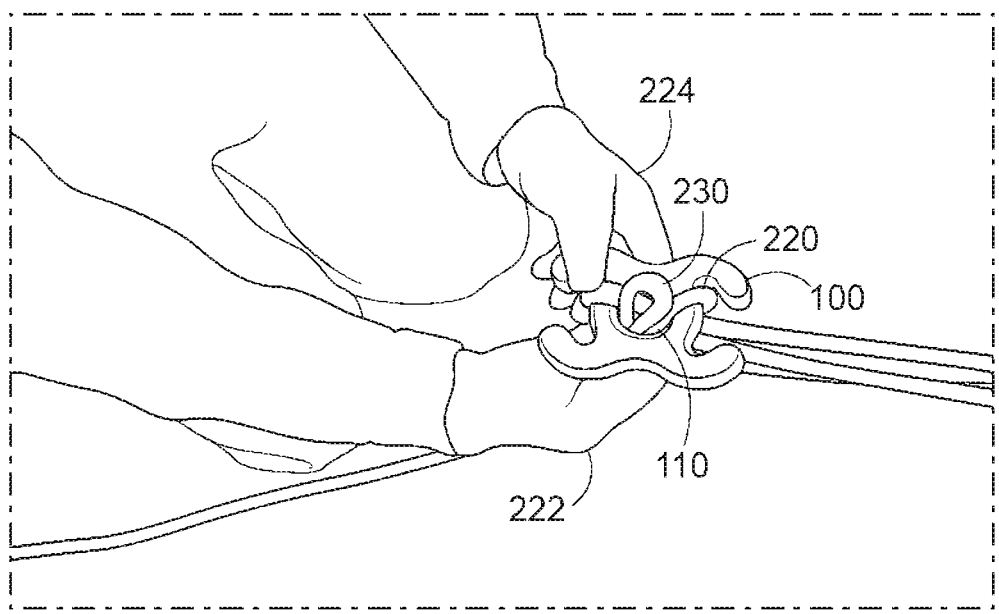
Figure 19:
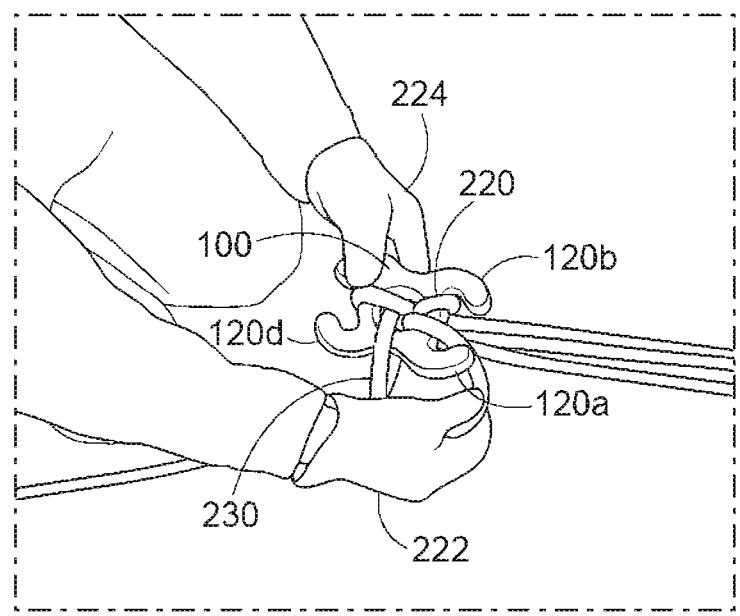
Figure 20:
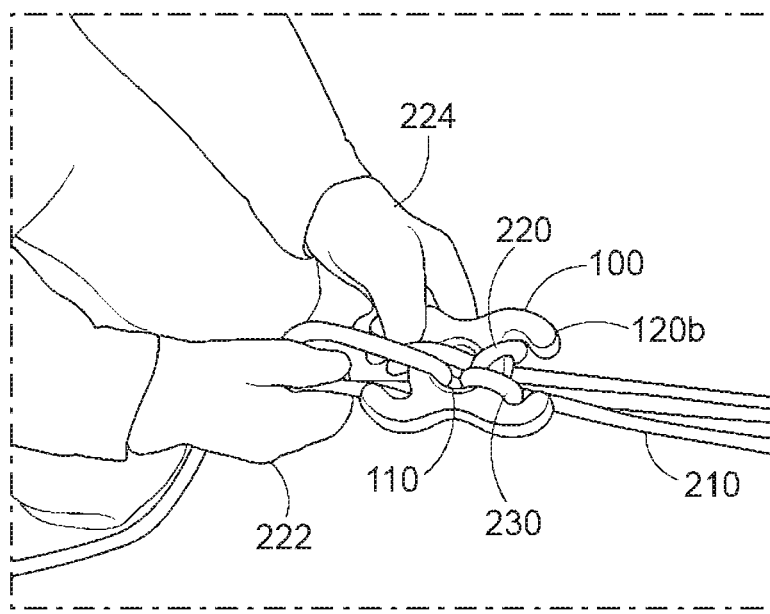
Figure 21:
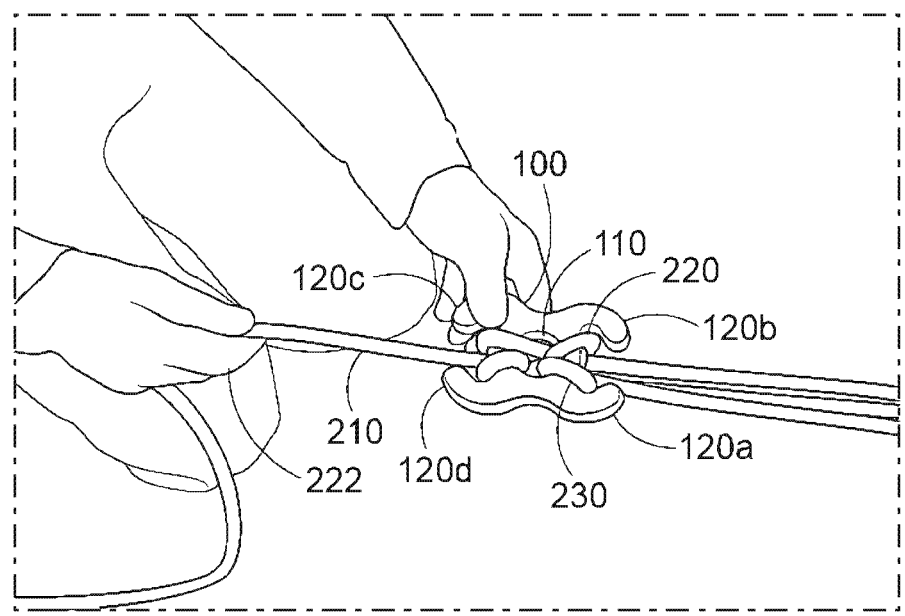
Figure 22:
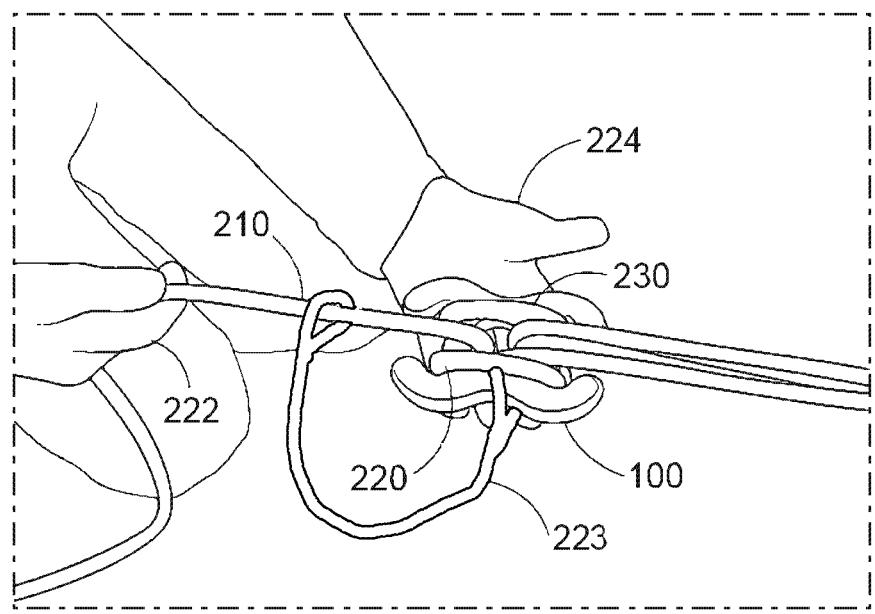
Figure 23:
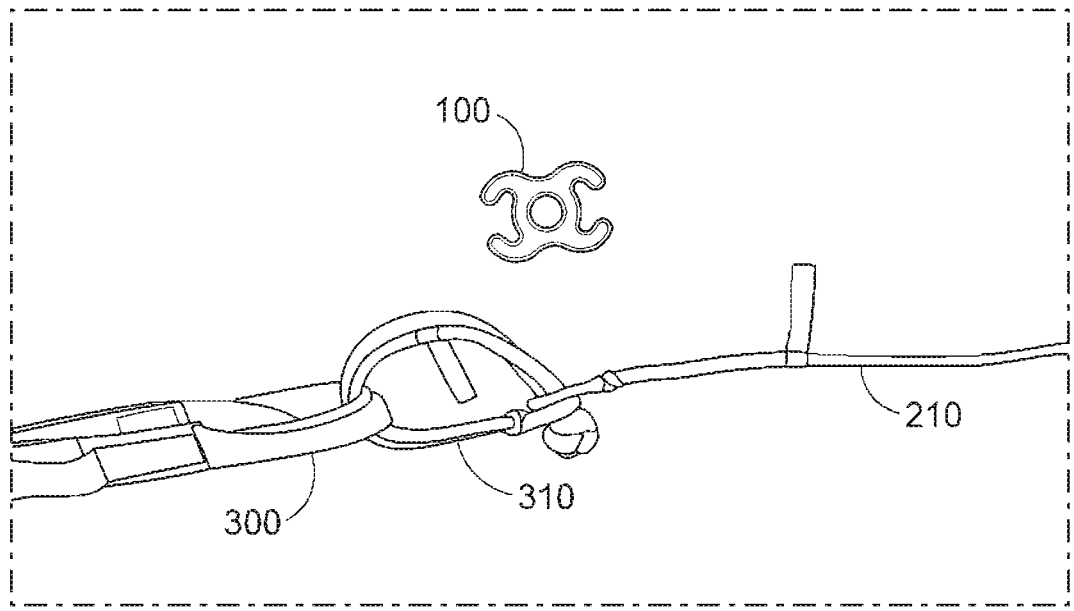
FIGS. 23 and 24 show exemplary anchors and/or connectors.
Figure 24:
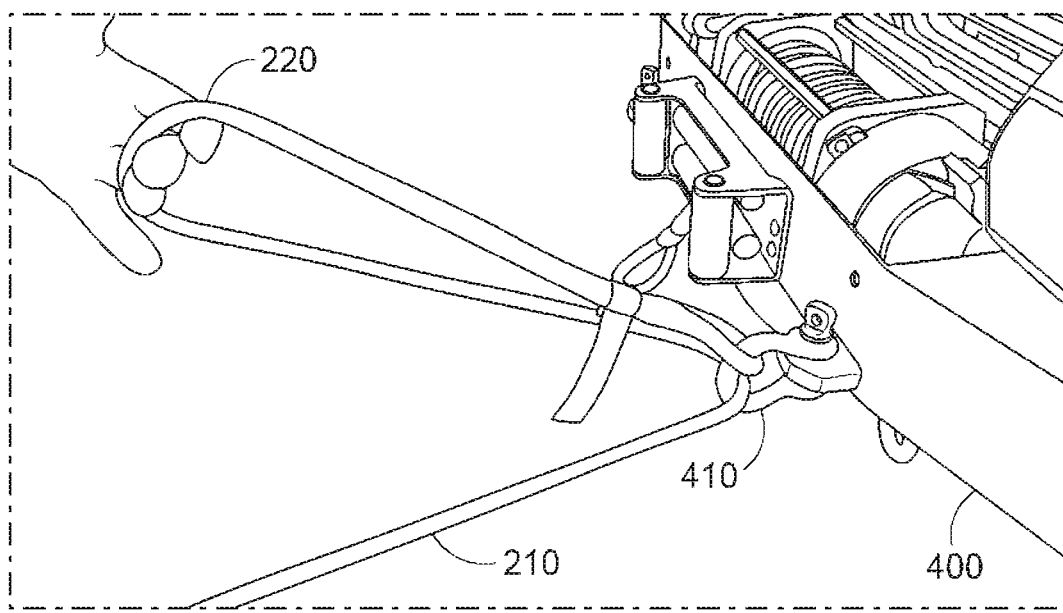
Figure 25:
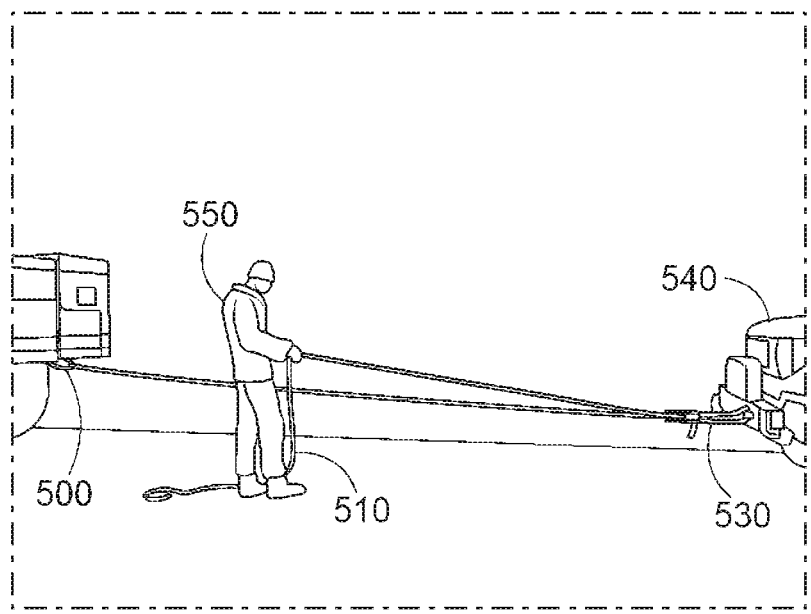
FIGS. 25-32 are a series of schematic drawings that sequentially show the inventive device being used in a belaying method according to the invention.

FIGS. 11-22 are a series of schematic drawings that sequentially show the inventive device 100 being used in a line-shortening method according to the invention. In particular, FIG. 11 shows an individual holding a free-running line 210 and a loop 220, both of which extend from an anchor (exemplary anchors are shown in FIGS. 23 and 24). In FIG. 11, the individual is holding the free-running line 210 in his right hand 222, and the loop 220 in his left hand 224 (the particular hand used is not important, and either can be used). The anchor could be a conventional "daisy chain knot". But this is not preferred. In a "daisy chain knot", the line is essentially looped over itself and on itself creating a "bight on a bight" situation. The point of contact puts a lot of pressure on a small surface area, which reduces the load capacity of the line and creates an undesired risk of line damage. The bend radius of the line in the "bight on a bight" situation is the line diameter itself, which is less than optimal (i.e., it is too small). Thus, it is more preferable to eliminate the use of "daisy chain knots" entirely, and install the device 100 on a free-running line and loop extending from an anchor that does not include a "bight" or a "bight on a bight" on the line (e.g., an eye-bolt, screw pin bow shackle or other vehicle recovery point). FIG. 12 shows the loop 220 (held in the left hand 224) about to be inserted through the central opening 110 of the device 100 (being held in the right hand 222). FIG. 13 shows the loop 220 passing through the central opening 110 of the device 100. FIG. 14 shows the loop 220 being spread apart and a part thereof being positioned around finger section 120b of the device 100. FIG. 15 shows another part of the loop 220 positioned around a finger section 120c on the same side of the device, but on the opposite end thereof (it will be appreciated that finger sections 120a and 120d could have been used). FIG. 16 shows the device 100 after the loop 220 has been installed properly. FIG. 17 shows a new loop 230 being formed in the free running line 210. FIG. 18 shows the newly formed loop 230 in the free running line 210 being pushed through the central opening 110 of the device 100. FIG. 19 shows the newly formed loop being spread apart and positioned behind a finger section 120a on the other side of the device from where the loop 220 was previously installed. FIG. 20 shows the newly formed loop 230 in the free running line 210 being positioned behind the last finger section 120d where it will pass through the gap 140b between the tips 130c, 130d of the fingers on that end of the device 100. FIG. 21 shows the free-running line 210 being pulled outwardly (to the left toward the installer) from the device 100. The smooth surfaces of the device 100 and the absence of bights on a bight allows all of the lines to slide, as needed, to equilibrate the tension thereon as force is drawn on the free-running line 210 (e.g., by a winch). FIG. 22 shows another view (rear side) of the device 100 and lines attached thereto.

As noted above, there is no "bight-on-a-bight" when a line is installed on the device 100 as described above. The lines are free to adjust and equilibrate when force is drawn on the line. The smoothness of the device and the separation of the lines facilitates this movement, and thus there is no possibility of breakage due to a bight "creeping" over another bight. As previously noted above, it is preferable that the device be installed to eliminate "daisy chain knots" in all instances, as "daisy chain knots" inherently create a "bight" on a line and elimination thereof retains line capacity. But the device can be used after a "daisy chain knot" if necessary or desired.

The hands used to install the loop and new loop on the device are not important, and either can be used. Similarly, it is not important whether the loop 220 or the new loop 230 are installed on the device 100 first, or whether or not the loop 220 and new loop pass 230 through the central opening 110 from the same or opposite sides of the device 100. In the illustrated embodiment, the loop 220 was installed first, and the new loop 230 was installed second from the same side of the device 100. But this is largely an issue of preference, and the order and direction can be reversed without adversely affecting the performance of the device and method.

It will be appreciated that once the device is installed, the device is essentially "locked" to the line. Thus, unlike a conventional "dog bone" that can fall out when tension is temporarily reduced on the line, the device according to the invention stays in place until it is purposefully unfastened. This can be very important in vehicle recovery applications.

For example, sometimes a winch line is used to pull a functioning, but stuck, vehicle up a hill. In such instances, the stuck vehicle may suddenly and temporarily gain enough traction to drive itself up the hill for a short distance while the winch is still operating. The speed of the stuck vehicle driving under its own power can exceed the rate at which the winch is retrieving the line. This results in slack in the winch line. This slack can allow a conventional "dog bone" to fall out. If the stuck vehicle once again loses traction and/or power and can no longer move itself up the hill, the stuck vehicle may begin sliding back down the hill. If the "dog bone" fell out when the line went slack, a potentially catastrophic situation can occur. By the time the stuck vehicle reaches the full length of the winch line (i.e., by the time each "daisy chain" knot unravelling behind the missing "dog bone" has unraveled), the speed the stuck vehicle sliding down the hill could be so great that it would result in a massive shock load on the system that could break the line and/or the equipment/anchor it is attached thereto. Furthermore, the vehicle being recovered could then proceed farther down the hill and be irretrievably lost.

The device according to the invention does not fall out when tension is temporarily reduced or removed. Thus, in the event a stuck vehicle was able to drive a short period of time under its own power and then lose traction and slide back down, the only distance that the stuck vehicle would slide is the amount of slack not yet taken up by the winch. Thus, the device and method according to the invention is much safer than conventional "dog bone" systems.

Another feature of the invention is the ease by which the device can be installed and inspected after it has been installed. Unlike a conventional "dog bone". It is no longer necessary to maintain tension on the device to permit inspection. The installed device can be set on the ground, and inspection can be made at a later time. And inspection is simplified by the clear arrangement of the lines in the device (particularly when both the loop and the new loop are inserted through the central opening from the same side).

As noted above, the line to be shortened preferably extends from an anchor point. The anchor point can have any suitable configuration. FIG. 23 shows a device 100 according to the invention above a tree saver 300 (also known as a "recovery strap") to which a soft shackle 310 has been installed (middle). A line 210 to be shortened extends from the soft shackle 310 (to the right). FIG. 24 shows another exemplary anchor point. In this instance, the anchor is a vehicle 400 recovery point and a screw pin bow shackle 410.

Another feature of the invention is that the central opening 110 allows a safety lanyard 223 (see FIG. 22) to be connected to the device 100 and to the free-running line 210 passing through the device 100. Thus, if there was a line failure, the device would remain tethered to the free-running line via the safety lanyard, and would not be launched as an uncontrolled projectile.

Figure 26:
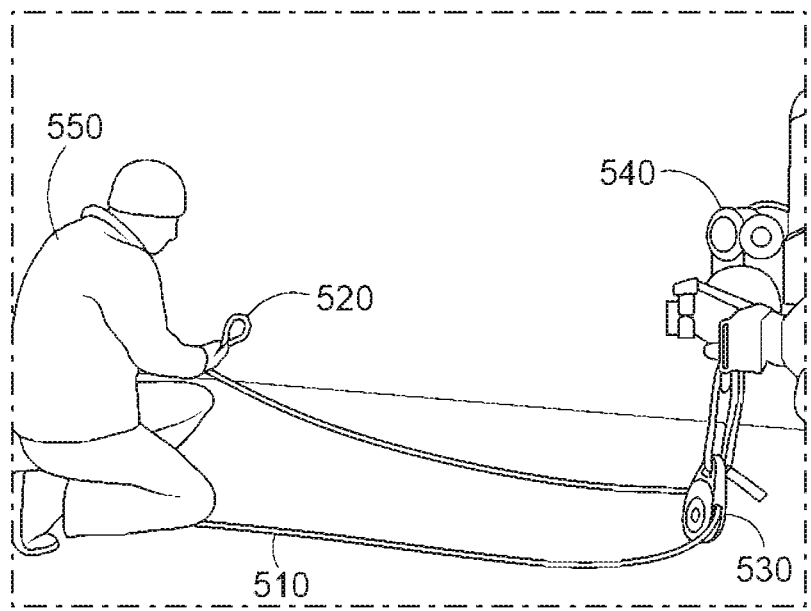
Figure 27:
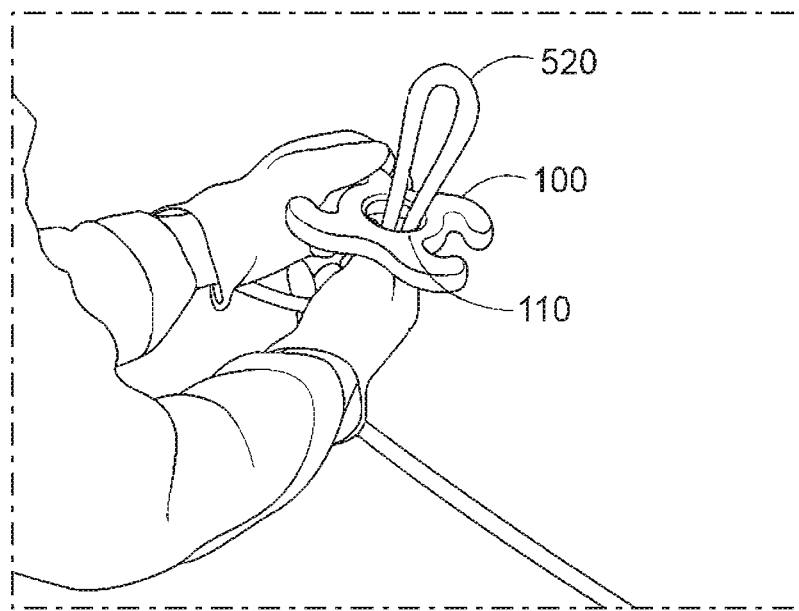
Figure 28:
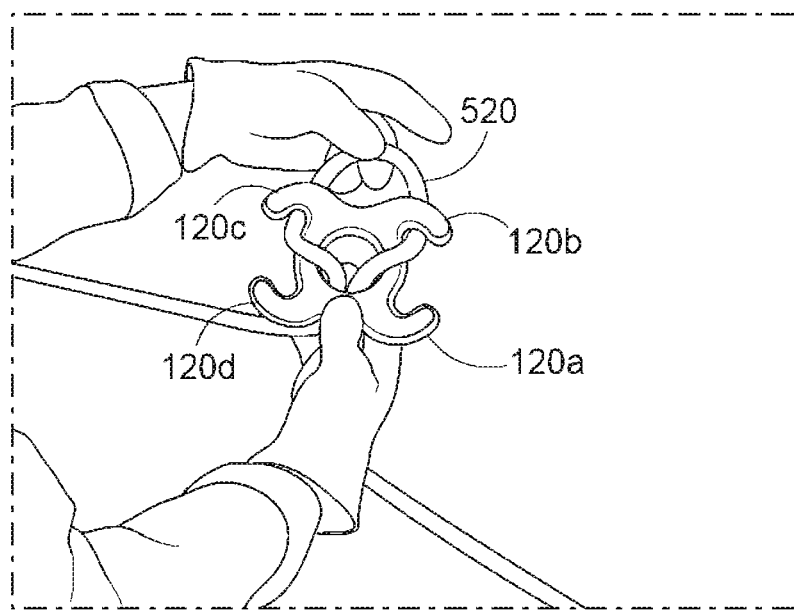
Figure 29:
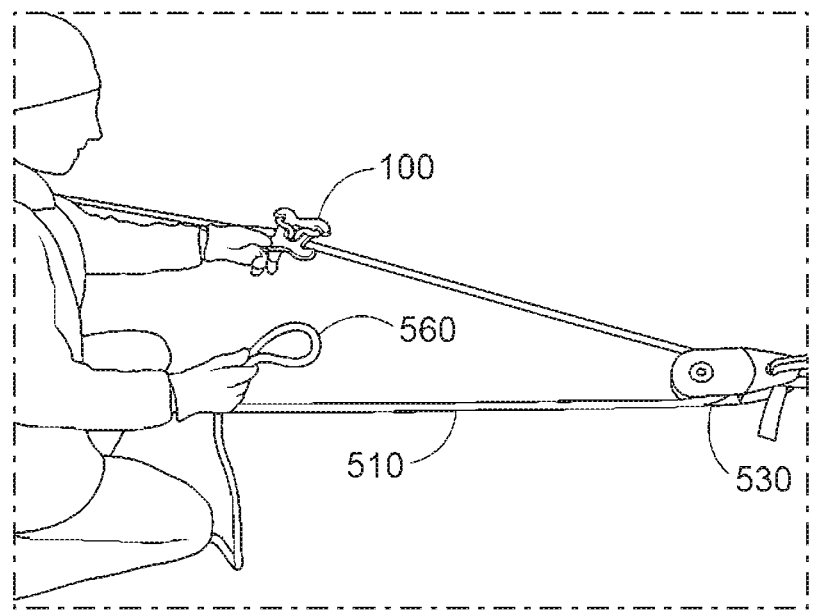
Figure 30:
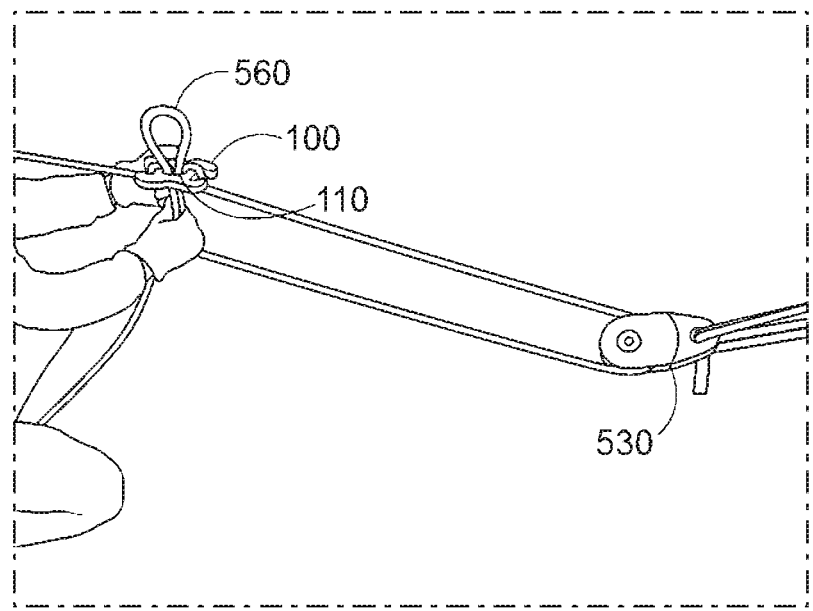
Figure 31:
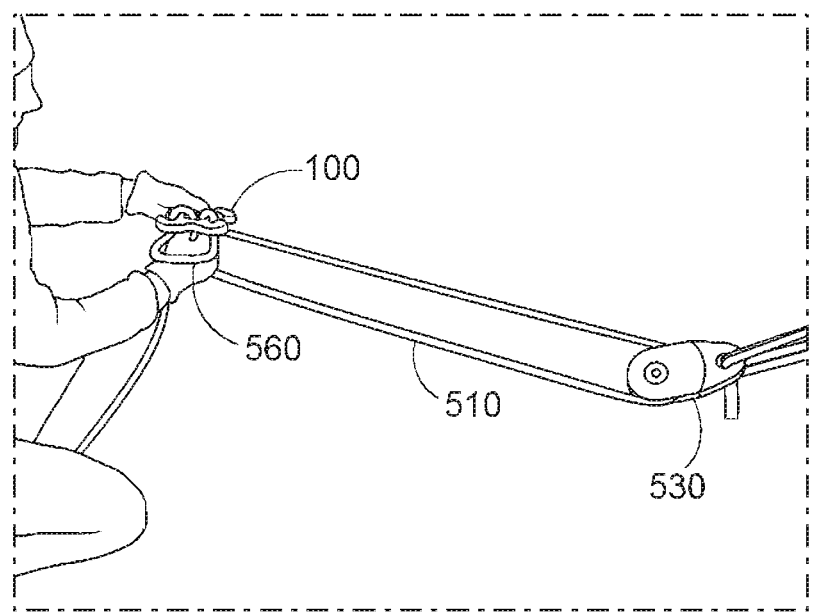
Figure 32:
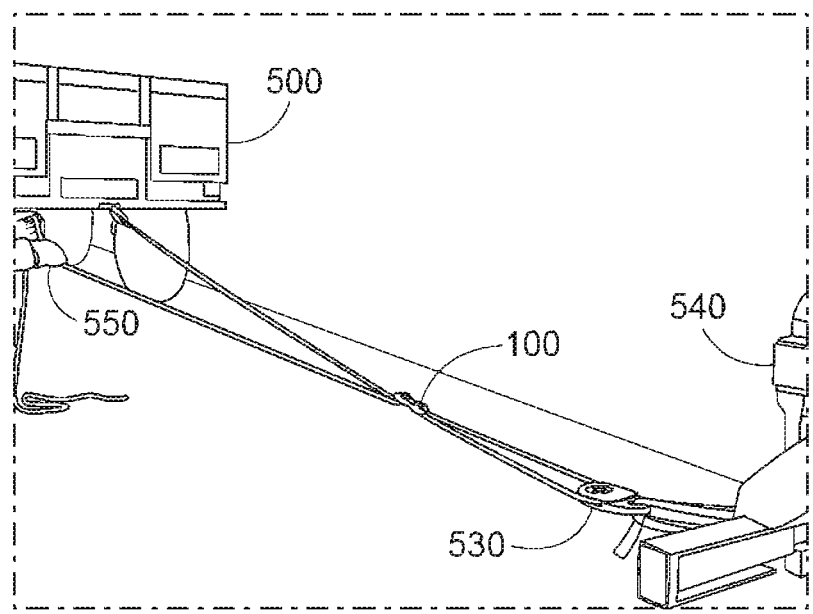

FIGS. 25-42 are a series of schematic drawings that sequentially show the inventive device being used in a belaying method according to the invention. In the illustrated embodiment, a large vehicle serves as an anchor 540, which will be used to belay an object (e.g., lighter vehicle 500). Belay in this context could mean lowering the object 500 down a slope, or holding the object 500 secure from movement down a slope while work is being done on it, for example. In the illustrated embodiment, the end of a winch line extension 510 is connected to the object (e.g., vehicle 500) to be belayed. From there the winch line extension 510 passes through a pulley block 530 connected to the anchor 540 and then to be held by the person(s) 550 doing the belay. The line between the object being belayed and the pulley block (i.e., the line going into the pulley block from the object being belayed) is first folded to form a loop 520. In FIG. 26, the person 550 has his knee on the line 510 coming out the pulley block 530, and has formed a loop 520 in the line between the object being belayed and the pulley block. As shown in FIG. 27, the loop 520 is passed through the central opening 110 in the device 100, and then (as shown in FIG. 28), the loop 520 is placed behind finger sections 120b and 120c and tightened (finger sections 120a and 120d could have been used for this purpose). As shown in FIG. 29, the line 510 coming out of the pulley block (i.e., the loose end) is now folded to form a loop 560, which as shown in FIG. 30 is passed through the central opening 110 in the device 100. Loop 560 is wrapped behind finger sections 120a and 120d (see FIG. 31), and slack is removed so that the lines are tight against the device 100. The loose end of the line 510 that now comes out of the device 100 is held by the person(s) 550. The person 550 can slowly let out the line 510 through the device 100 to allow the object being belayed 500 to move away from the anchor 540. In the alternative, the object 500 could be held secure from movement by the person 550 holding the loose end of the line 510 (i.e., the end of the line coming out of the device 100) to prevent the object 500 from moving (e.g., while work was being done on it). The line 510 does not wrap or "bite" on itself. The line can move through the device 100, as permitted by the person 550. In this sense, the device 100 functions as a friction belay device.

It should be appreciated that the pulley block 530 could alternatively be connected to the object to be belayed 500 rather than the anchor 540, and also that regardless of the arrangement, either object can be belayed using the device 100. In fact, it is possible for both objects 500 and 540 to be belayed using the device 100 without removing the device 100 from its initial set-up. For example, it may be desirable to allow vehicles to controllably roll down opposing sides of a hill. Using a single set-up of the device 100 between the two vehicles, the two vehicles could be alternately belayed, one and then the other. The first vehicle is belayed while the second is serving as the anchor, and then the second vehicle is belayed while the first is serving as the anchor. Thus, the device 100 according to the invention can be used to belay from the pulley block 530 end or the fixed end through the "loose" (550 in FIG. 32) end being controlled by a person to pass through the device 100.

Figure 33:
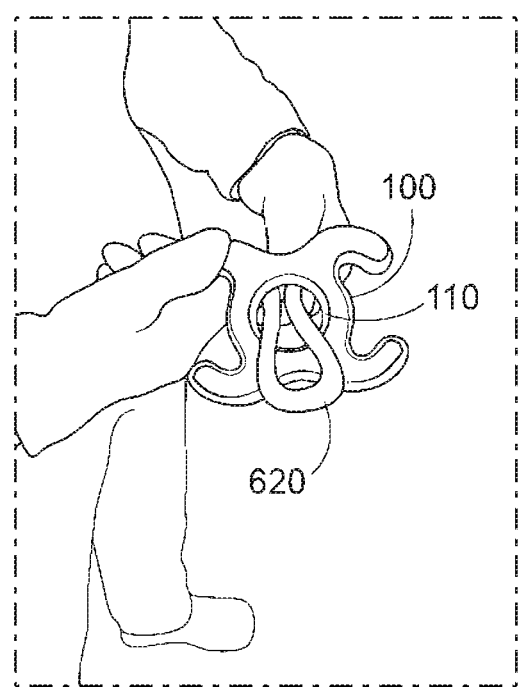
FIGS. 33-40 are a series of schematic drawings that sequentially show the inventive device being used in a method to join lines or winch line extensions according to the invention.
Figure 34:
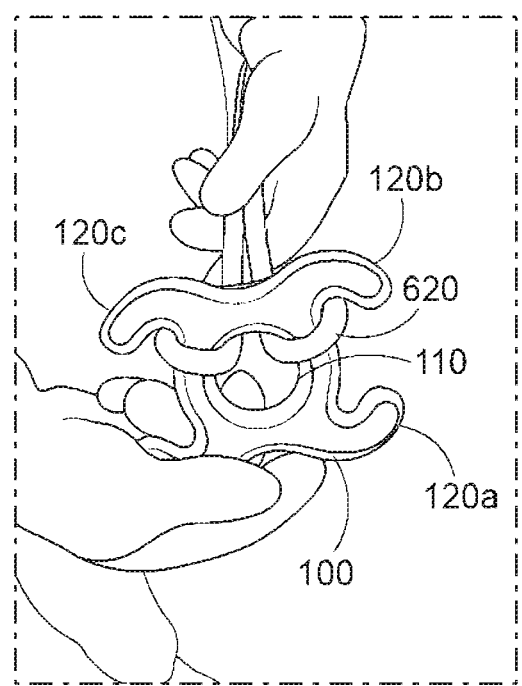

FIGS. 33-40 are a series of schematic drawings that sequentially show the inventive device being used in a method to join lines or winch line extensions. As shown in FIG. 33, the eye 620 on the end of a winch line (i.e., a winch line eye) is passed through the central opening 110 of the device 100 and folded and tightened over the finger sections 120b, 120c, The winch line eye, which is in the form of a loop, passes through each of the gaps 140a, 140b, and is drawn tight against the device 100. FIG. 34 shows the winch line eye 620 properly installed. If the winch line eye 620 is rubberized (which would prevent it from being able to slide on the device 100) or if the winch line has a thimble or hook instead of an eye, one can simply fold the winch line into a loop and pass this loop through the central opening in the device and tighten the loop over the finger sections of the device as shown. Then the end with the thimble or hook could be tied around the incoming line to further secure it from slipping using a half hitch knot. Thus, the device 100 can be used to join lines (e.g., join winch lines and/or winch line extensions) even without there being a spliced eye. As noted, one can create a loop at the end the of the line and pass the loop through the central opening of the device as described above, just as if the loop was a spliced eye. Then the tail end of the line extending from the loop can simply be tied off with several half hitch knots (or similar knot), which is what the splice that forms the eye essentially does. So if a line (e.g., a winch line) breaks, the device 100 can be used to: (1) connect the two broken ends of the line (neither of which has an eye) in this manner (and because the device 100 can secure the two loops separately without a "bight on a bight" the connection between them is strong and can be easily undone again); and (2) to shorten the combined length of two lines by making a loop in a desired and appropriate place in one or both of the lines, and then tie off as described. Thus, the device 100 can shorten the length of a broken winch line. Multiple devices 100 can be used simultaneously (i.e., it is possible to use one device 100 to join two broken lines and also use another device 100 for belaying purposes).

Figure 35:
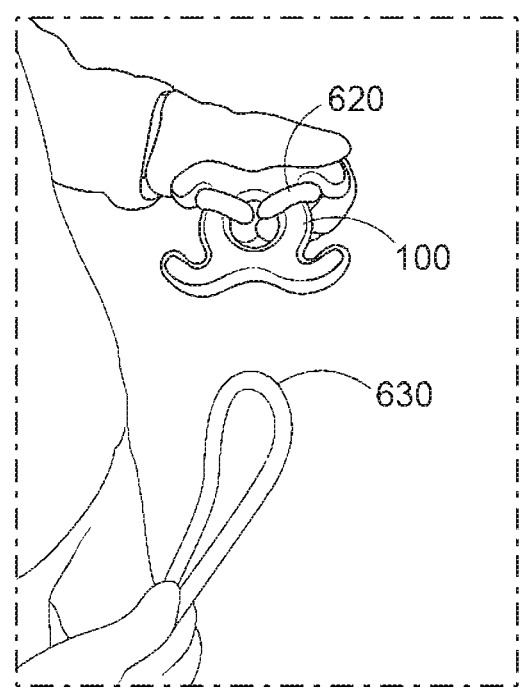
Figure 36:
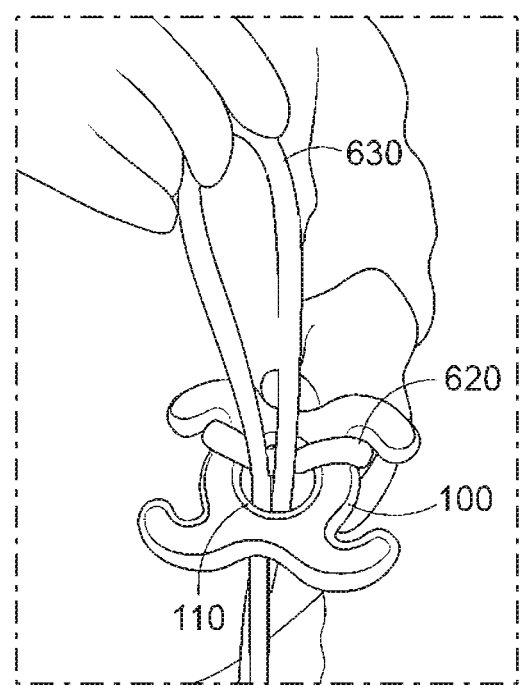
Figure 37:
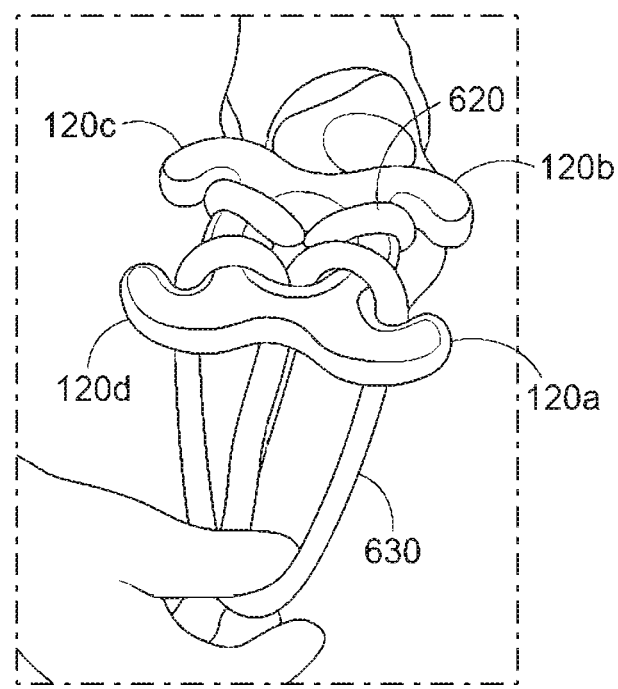
Figure 38:
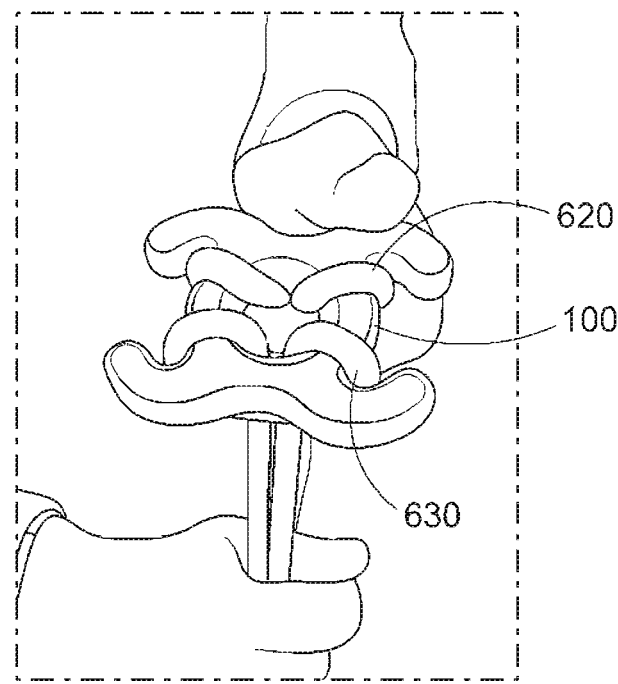
Figure 39:
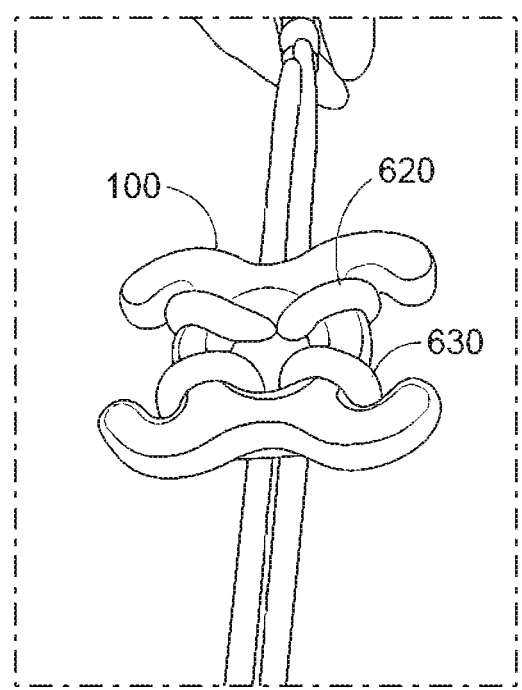
Figure 40:
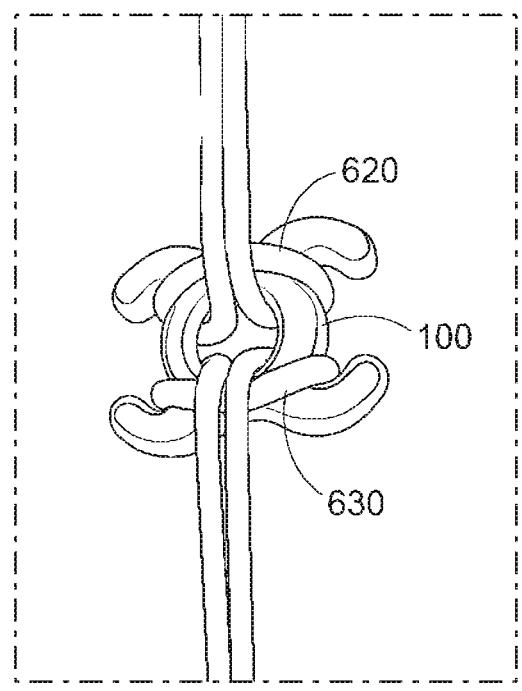

FIG. 35 shows second winch line eye 630 from a second winch line being brought to the device 100 to be joined to the first winch line via the device 100. The second winch line eye 630 is inserted through the central opening of the device 100 as shown in FIG. 36, is wrapped behind the opposite two finger sections 120a, 120d as shown in FIG. 37, and then drawn tight as shown in FIG. 38. FIGS. 39 and 40 show top and bottom views, respectively, of the two winch lines properly joined to the device 100.

Figure 41:
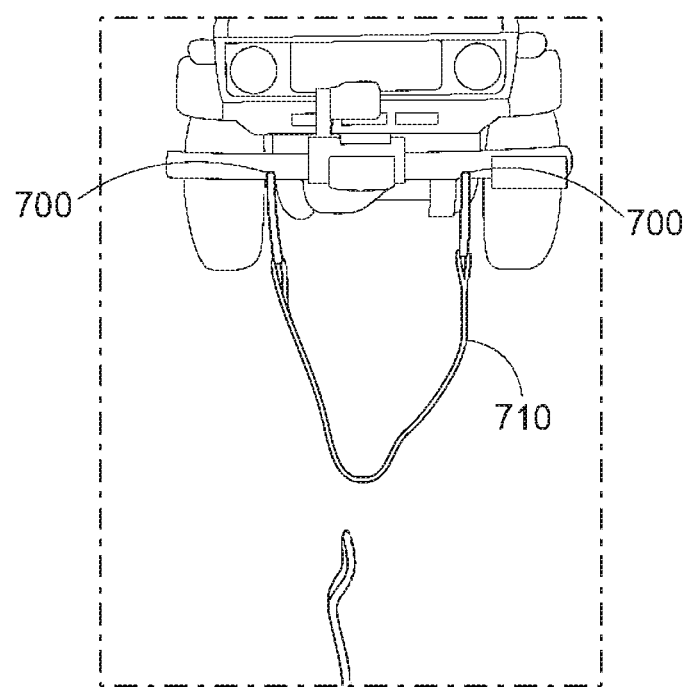
FIGS. 41-49 are a series of schematic drawings that sequentially show the inventive device being used in a V-bridle method.
Figure 42:
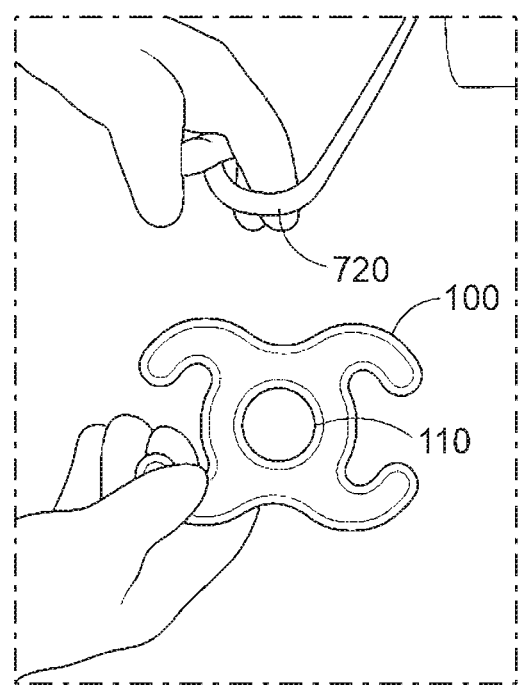
Figure 43:
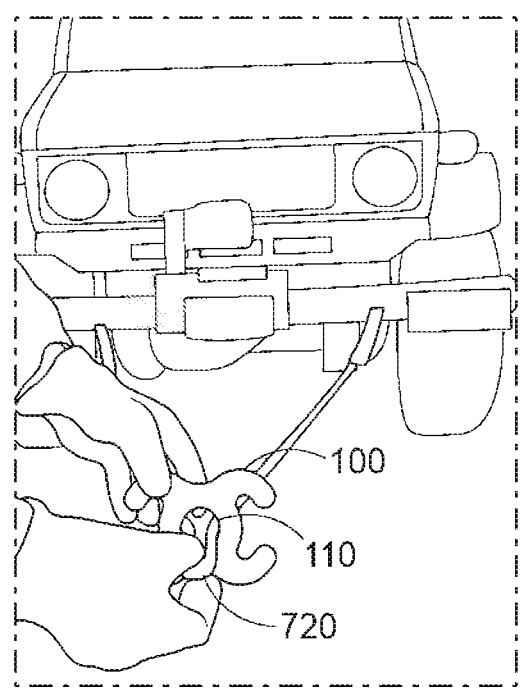
Figure 44:
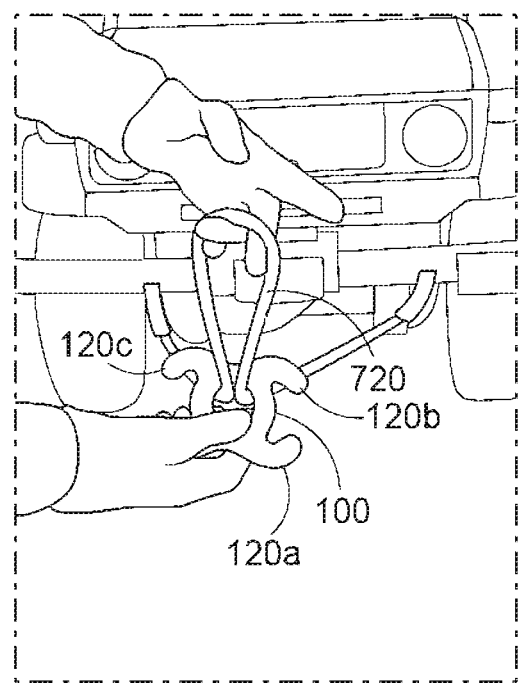
Figure 45:
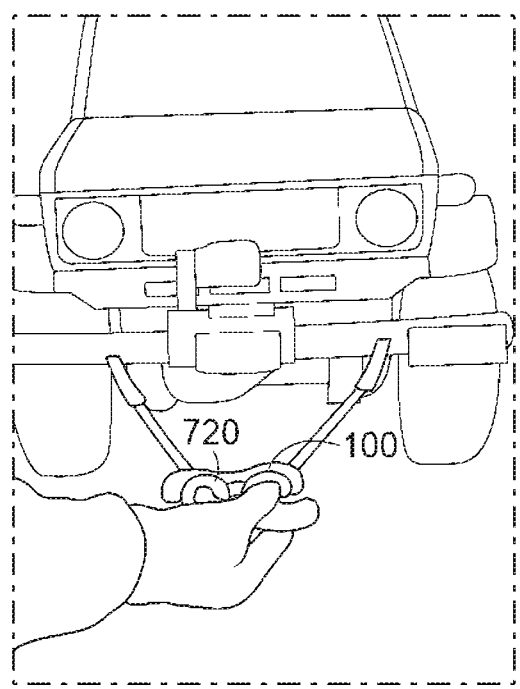
Figure 46:
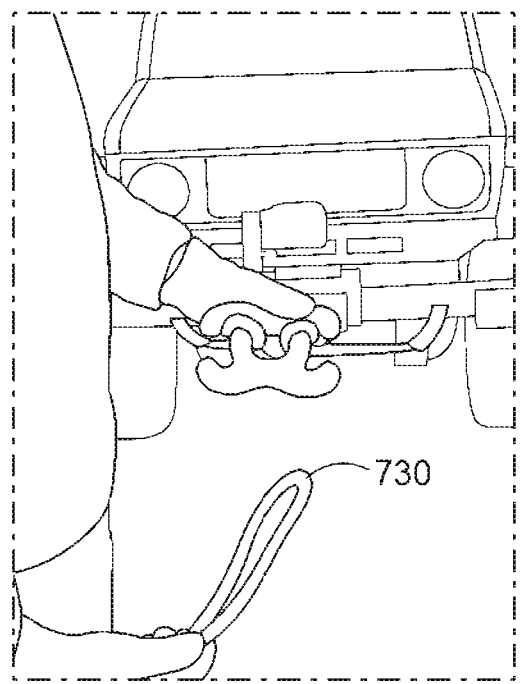
Figure 47:
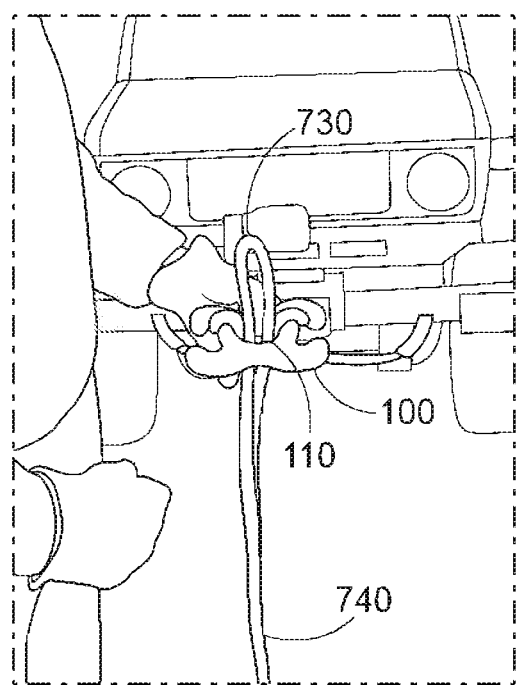
Figure 48:
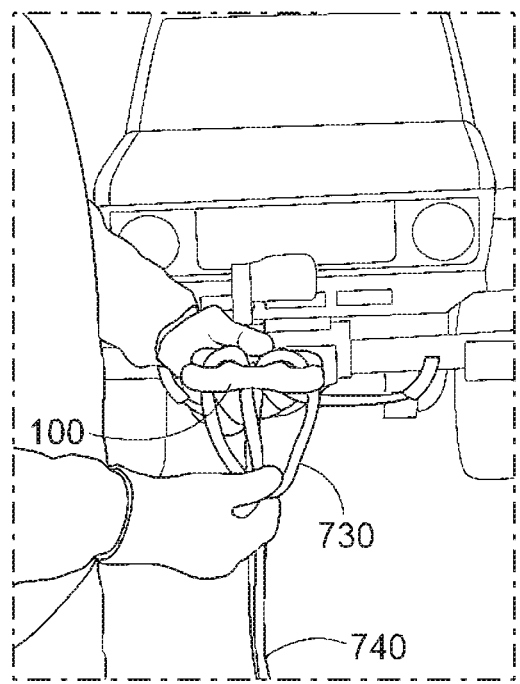
Figure 49:
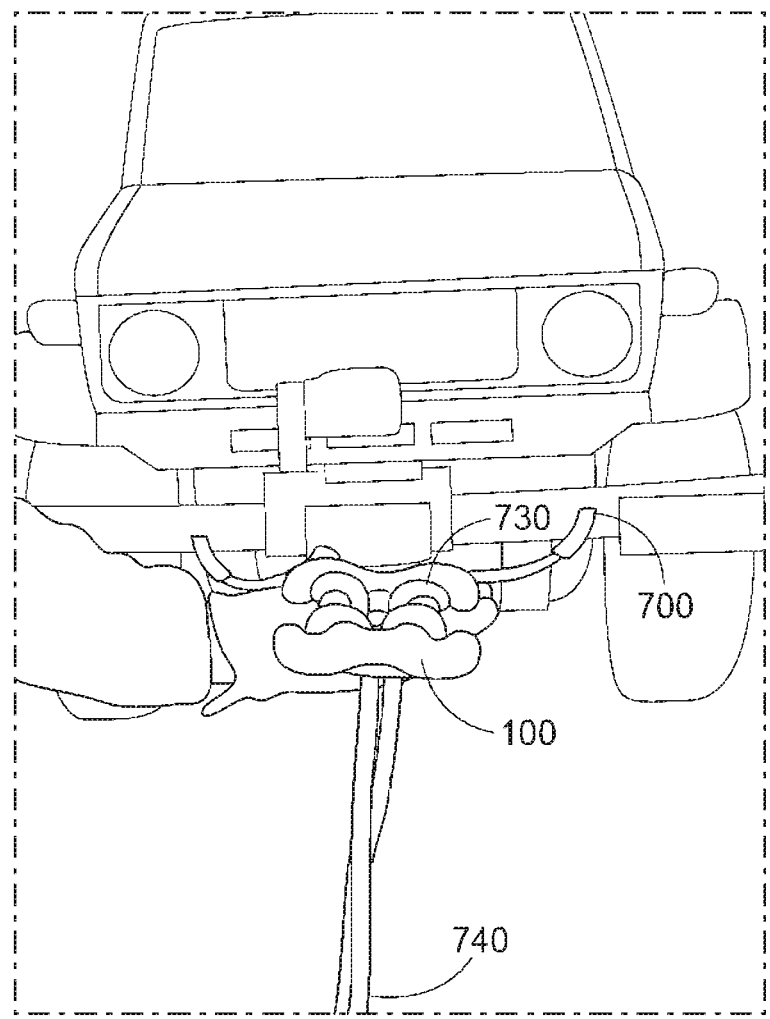

FIGS. 41-49 are a series of schematic drawings that sequentially show the inventive device being used in a V-bridle method. In this method and as illustrated in FIG. 41, a relatively short piece of winch line 710 (e.g., a safety lanyard that is included as part of a vehicle recovery kit), is connected at each end to spaced-apart recovery points 700 on either side of a vehicle, thereby spreading the load to two recovery points 700 instead of one. Each end of the safety lanyard has spliced eyes, which are formed in the same manner as in the case of winch lines and winch line extensions. A person preferably grasps the center of the winch line 710 to create an isosceles [two equal sides] triangle. As shown in FIG. 42, the person creates a loop 720 in the winch line 710 and passes this loop 720 through the central opening 110 in the device 100 as shown in FIG. 43. The loop 720 is folded behind finger sections 120b, 120c by passing portions of the loop through gaps 140a, 140b, as shown in FIG. 44. Once the loop 720 is properly positioned, slack is taken out of the winch line 710 and the assembly is drawn tight against the device 100, as shown in FIG. 45. Next, one takes a winch line eye 730 from another winch line 740 (see FIGS. 46-48) and passes the winch line eye 730 through the central opening 110 of the device 100 as previously described above. Once installed as show in FIG. 49, the second winch line 740 can be used to pull the vehicle to which the first winch line 710 is anchored using the V-bridle thus formed. Again, no line is folded over another line, which can cause line failure.

It is also possible to position the device 100 other than at a point in the winch line 710 that creates an isosceles triangle. This can be useful when the pull is to be made from a side angle. In this instance, the device 100 is positioned at a point in the winch line 710, which will produce a desired pull (i.e., such that roughly equal amounts of force are applied to both recovery points 700 during the pull from the side). In this manner, the device 100 keeps an "off set V Bridal configuration" in the desired location without damage to the winch line 710 or recovery points 700 because the device 100 resists movement under tension.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method for shortening a line extending from an anchor such that the line has a free-running section and a loop, the method comprising:
providing a device comprising a unitary rigid body having an annular portion surrounding a central opening and at least a first finger section that extends from the annular portion of the rigid body, a second finger section that extends from the annular portion of the rigid body, a third finger section that extends from the annular portion of the rigid body, and a fourth finger section that extends from the annular portion of the rigid body, wherein the first finger section and the second finger section curve toward each other on one end of the rigid body and terminate in blunt tips that are spaced apart from each other by a gap, and wherein the third finger section and the fourth finger section curve toward each other on an opposite end of the rigid body and terminate in blunt tips that are spaced apart from each other by a gap;
inserting the loop through the central opening of the device;
positioning part of the loop behind the first finger section and another part of the loop behind the fourth finger section;
forming a second loop in the free-running section of the line;
inserting the second loop through the central opening; and
positioning part of the second loop behind the second finger section and another part of the second loop behind the third finger section.

2. The method according to claim 1, wherein the anchor is an eye-bolt, screw pin bow shackle or a vehicle recovery point.

3. The method according to claim 1, wherein the line to be shortened extends from a "daisy chain knot" between the anchor and the device.

4. The method according to claim 1, further comprising installing a safety lanyard to the device and to the line.

5. A method for extracting a stuck vehicle, the method comprising:
providing a device comprising a unitary rigid body having an annular portion surrounding a central opening and at least a first finger section that extends from the annular portion of the rigid body, a second finger section that extends from the annular portion of the rigid body, a third finger section that extends from the annular portion of the rigid body, and a fourth finger section that extends from the annular portion of the rigid body, wherein the first finger section and the second finger section curve toward each other on one end of the rigid body and terminate in blunt tips that are spaced apart from each other by a gap, and wherein the third finger section and the fourth finger section curve toward each other on an opposite end of the rigid body and terminate in blunt tips that are spaced apart from each other by a gap;
unspooling winch line from a winch drum of a winch of the stuck vehicle;
securing the winch line to an anchor;
passing an intermediate portion of the winch line through the anchor or another anchor device similarly anchored such that the winch line extending toward the stuck vehicle has a free-running section and a loop;
inserting the loop through the central opening of the device;
positioning part of the loop behind the first finger section and another part of the loop behind the fourth finger section;
forming a second loop in the free-running section of the line;
inserting the second loop through the central opening;
positioning part of the second loop behind the second finger section and another part of the second loop behind the third finger section; and
extracting the stuck vehicle by recovering winch line using the winch of the stuck vehicle.

6. A method for extracting a stuck vehicle, the method comprising:
providing a device comprising a unitary rigid body having an annular portion surrounding a central opening and at least a first finger section that extends from the annular portion of the rigid body, a second finger section that extends from the annular portion of the rigid body, a third finger section that extends from the annular portion of the rigid body, and a fourth finger section that extends from the annular portion of the rigid body, wherein the first finger section and the second finger section curve toward each other on one end of the rigid body and terminate in blunt tips that are spaced apart from each other by a gap, and wherein the third finger section and the fourth finger section curve toward each other on an opposite end of the rigid body and terminate in blunt tips that are spaced apart from each other by a gap;
unspooling winch line from a winch drum of a winch of the stuck vehicle;
securing the winch line to a winch line extension;
securing the winch line extension to an anchor;
passing an intermediate portion of the winch line extension through the anchor or another anchor device similarly anchored such that the winch line extension extending toward the stuck vehicle has a free-running section and a loop inserting the loop through the central opening of the device;
positioning part of the loop behind the first finger section and another part of the loop behind the fourth finger section;
forming a second loop in the free-running section of the line;
inserting the second loop through the central opening;
positioning part of the second loop behind the second finger section and another part of the second loop behind the third finger section; and
extracting the stuck vehicle by recovering winch line using the winch of the stuck vehicle.

7. A method for extracting a stuck vehicle, the method comprising:
providing a device comprising a unitary rigid body having an annular portion surrounding a central opening and at least a first finger section that extends from the annular portion of the rigid body, a second finger section that extends from the annular portion of the rigid body, a third finger section that extends from the annular portion of the rigid body, and a fourth finger section that extends from the annular portion of the rigid body, wherein the first finger section and the second finger section curve toward each other on one end of the rigid body and terminate in blunt tips that are spaced apart from each other by a gap, and wherein the third finger section and the fourth finger section curve toward each other on an opposite end of the rigid body and terminate in blunt tips that are spaced apart from each other by a gap;
unspooling winch line from a winch drum of a winch of a recovery vehicle;
securing the winch line to the stuck vehicle;
passing an intermediate portion of the winch line through an anchor attached to the stuck vehicle such that the winch line extending toward the recovery vehicle has a free-running section and a loop;
inserting the loop through the central opening of the device;
positioning part of the loop behind the first finger section and another part of the loop behind the fourth finger section;
forming a second loop in the free-running section of the line;
inserting the second loop through the central opening;
positioning part of the second loop behind the second finger section and another part of the second loop behind the third finger section; and
extracting the stuck vehicle by recovering winch line using the winch of the recovery vehicle.

8. A method for extracting a stuck vehicle, the method comprising:
providing a device comprising a unitary rigid body having an annular portion surrounding a central opening and at least a first finger section that extends from the annular portion of the rigid body, a second finger section that extends from the annular portion of the rigid body, a third finger section that extends from the annular portion of the rigid body, and a fourth finger section that extends from the annular portion of the rigid body, wherein the first finger section and the second finger section curve toward each other on one end of the rigid body and terminate in blunt tips that are spaced apart from each other by a gap, and wherein the third finger section and the fourth finger section curve toward each other on an opposite end of the rigid body and terminate in blunt tips that are spaced apart from each other by a gap;
unspooling winch line from a winch drum of a winch of a recovery vehicle;
securing the winch line to a winch line extension;
securing the winch line extension to the stuck vehicle, passing an intermediate portion of the winch line extension through an anchor attached to the stuck vehicle such that the winch line extension extending toward the recovery vehicle has a free-running section and a loop;

inserting the loop through the central opening of the device;

positioning part of the loop behind the first finger section and another part of the loop behind the fourth finger section;

forming a second loop in the free-running section of the line;

inserting the second loop through the central opening;

positioning part of the second loop behind the second finger section and another part of the second loop behind the third finger section; and extracting the stuck vehicle by recovering winch line using the winch of the recovery vehicle.

9. A method for belaying an object, the method comprising:

providing a device comprising a unitary rigid body having an annular portion surrounding a central opening and at least a first finger section that extends from the annular portion of the rigid body, a second finger section that extends from the annular portion of the rigid body, a third finger section that extends from the annular portion of the rigid body, and a fourth finger section that extends from the annular portion of the rigid body, wherein the first finger section and the second finger section curve toward each other on one end of the rigid body and terminate in blunt tips that are spaced apart from each other by a gap, and wherein the third finger section and the fourth finger section curve toward each other on an opposite end of the rigid body and terminate in blunt tips that are spaced apart from each other by a gap;

securing a line to the object;

passing the line through a pulley block attached to an anchor such that a portion of the line extends from the object to the pulley block and a portion of the line having a free end extends from the pulley block;

folding the portion of the line that extends from the object to the pulley block to form a loop;

inserting the loop through the central opening of the device;

positioning part of the loop behind the first finger section and another part of the loop behind the fourth finger section;

forming a second loop in the portion of the line having the free end;

inserting the second loop through the central opening;

positioning part of the second loop behind the second finger section and another part of the second loop behind the third finger section; and belaying the object by controlling movement of the portion of the line having the free end through the device.

10. A method for joining a first line and a second line together, the method comprising:

providing a device comprising a unitary rigid body having an annular portion surrounding a central opening and at least a first finger section that extends from the annular portion of the rigid body, a second finger section that extends from the annular portion of the rigid body, a third finger section that extends from the annular portion of the rigid body, and a fourth finger section that extends from the annular portion of the rigid body, wherein the first finger section and the second finger section curve toward each other on one end of the rigid body and terminate in blunt tips that are spaced apart from each other by a gap, and wherein the third finger section and the fourth finger section curve toward each other on an opposite end of the rigid body and terminate in blunt tips that are spaced apart from each other by a gap;

inserting a loop in the first line through the central opening of the device;

positioning part of the loop behind the first finger section and another part of the loop behind the fourth finger section;

inserting a loop in the second line through the central opening; and positioning part of the loop in the second line behind the second finger section and another part of the loop in the second line behind the third finger section.

11. The method according to claim 10, wherein the first line has an end provided with an eye that defines the loop.

12. The method according to claim 10, wherein the method further comprises forming the loop in the first line.

13. The method according to claim 12, wherein the first line has an end provided with a rubberized eye, a thimble or a hook, and the end of the first line is secured to the first line using a knot.

14. A method for forming a V-bridle, the method comprising:

providing a device comprising a unitary rigid body having an annular portion surrounding a central opening and at least a first finger section that extends from the annular portion of the rigid body, a second finger section that extends from the annular portion of the rigid body, a third finger section that extends from the annular portion of the rigid body, and a fourth finger section that extends from the annular portion of the rigid body, wherein the first finger section and the second finger section curve toward each other on one end of the rigid body and terminate in blunt tips that are spaced apart from each other by a gap, and wherein the third finger section and the fourth finger section curve toward each other on an opposite end of the rigid body and terminate in blunt tips that are spaced apart from each other by a gap;

securing a first line to two spaced apart anchor points on an object to be pulled;

forming a loop in the first line between the two spaced apart anchor points;

inserting the loop in the first line through the central opening of the device;

positioning part of the loop behind the first finger section and another part of the loop behind the fourth finger section;

inserting a loop of a second line through the central opening; and positioning part of the loop in the second line behind the second finger section and another part of the loop in the second line behind the third finger section.

* * * * *